(12) United States Patent
Tanaka et al.

(10) Patent No.: US 9,650,979 B2
(45) Date of Patent: May 16, 2017

(54) CONTROL DEVICE FOR INTERNAL COMBUSTION ENGINE

(71) Applicants: Satoru Tanaka, Odawara (JP); Satoshi Yoshizaki, Gotenba (JP)

(72) Inventors: Satoru Tanaka, Odawara (JP); Satoshi Yoshizaki, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/890,046

(22) PCT Filed: May 14, 2013

(86) PCT No.: PCT/JP2013/063431
§ 371 (c)(1),
(2) Date: Nov. 9, 2015

(87) PCT Pub. No.: WO2014/184872
PCT Pub. Date: Nov. 20, 2014

(65) Prior Publication Data
US 2016/0115892 A1 Apr. 28, 2016

(51) Int. Cl.
*F02P 5/00* (2006.01)
*F02D 41/14* (2006.01)
(Continued)

(52) U.S. Cl.
CPC ......... *F02D 41/1475* (2013.01); *F02D 37/02* (2013.01); *F02D 41/0002* (2013.01);
(Continued)

(58) Field of Classification Search
CPC .......... F02P 5/04; F02P 5/1504; F02D 19/081
(Continued)

(56) References Cited

U.S. PATENT DOCUMENTS 5,857,445 A 1/1999 Shimada et al.
6,089,206 A 7/2000 Suzuki et al.
(Continued)

FOREIGN PATENT DOCUMENTS

JP 7-119512 5/1995
JP 9-60543 3/1997
(Continued)

*Primary Examiner* — John Kwon
(74) *Attorney, Agent, or Firm* — Finnegan, Henderson, Farabow, Garrett & Dunner, LLP

(57) ABSTRACT

A target air amount for achieving a requested torque is back-calculated from the requested torque using a parameter that provides a conversion efficiency of an air amount to torque. The value of the parameter gradually changes to lower the conversion efficiency as the requested torque decreases from a second reference value towards a first reference value. The first reference value is calculated based on the engine speed. The second reference value is calculated based on an air amount with which the first reference value is achieved under a second air-fuel ratio, and a first air-fuel ratio. The target air-fuel ratio is set to the first air-fuel ratio when the requested torque is greater than the first reference value, and is switched from the first air-fuel ratio to the second air-fuel ratio when the requested torque decreases to a value equal to or less than the first reference value.

15 Claims, 13 Drawing Sheets

(51) Int. Cl.
*F02D 41/30* (2006.01)
*F02P 5/15* (2006.01)
*F02D 41/10* (2006.01)
*F02D 37/02* (2006.01)
*F02D 41/00* (2006.01)
*F02D 41/04* (2006.01)
*F02P 9/00* (2006.01)

(52) U.S. Cl.
CPC ........... *F02D 41/045* (2013.01); *F02D 41/10* (2013.01); *F02D 41/107* (2013.01); *F02D 41/3005* (2013.01); *F02D 41/307* (2013.01); *F02D 41/3029* (2013.01); *F02P 5/1504* (2013.01); *F02P 9/002* (2013.01); *F02D 2200/1004* (2013.01); *F02D 2250/21* (2013.01); *F02D 2250/22* (2013.01); *Y02T 10/46* (2013.01)

(58) Field of Classification Search
USPC ........ 123/406.23, 406.24, 434; 701/103, 111
See application file for complete search history.

(56) References Cited

U.S. PATENT DOCUMENTS

| | | | | |
|---|---|---|---|---|
| 2016/0090929 | A1* | 3/2016 | Tanaka | F02D 41/12 123/406.52 |
| 2016/0123246 | A1* | 5/2016 | Saito | F02P 5/15 123/444 |
| 2016/0123252 | A1* | 5/2016 | Yoshizaki | F02D 41/107 123/436 |
| 2016/0123253 | A1* | 5/2016 | Saito | F02D 41/307 123/406.23 |
| 2016/0153373 | A1* | 6/2016 | Yoshizaki | F02D 41/10 123/406.48 |
| 2016/0312734 | A1* | 10/2016 | Yoshizaki | F02D 41/2461 |
| 2016/0369712 | A1* | 12/2016 | Matsumoto | F02D 41/0002 |

FOREIGN PATENT DOCUMENTS

| | | |
|---|---|---|
| JP | 11-22609 | 1/1999 |
| JP | 2008-38865 | 2/2008 |
| JP | 2010-223122 | 10/2010 |

* cited by examiner

CONTROL DEVICE FOR INTERNAL COMBUSTION ENGINE

CROSS-REFERENCE TO RELATED APPLICATIONS

This application is a national phase application of International Application No. PCT/JP2013/063431, filed May 14, 2013, the content of which is incorporated herein by reference.

TECHNICAL FIELD

The present invention relates to a control device that performs integrated control of an air amount, a fuel supply amount and an ignition timing of an internal combustion engine that is configured to be capable of switching an air-fuel ratio that is used for operation between at least two air-fuel ratios.

BACKGROUND ART

In JP11-22609A, technology (hereunder, referred to as "prior art") is disclosed that relates to control for switching a combustion system in an internal combustion engine in which the combustion system of the internal combustion engine can be switched from stratified combustion to homogeneous combustion, or from homogeneous combustion to stratified combustion. Since an air-fuel ratio during stratified combustion is leaner than an air-fuel ratio during homogeneous combustion, switching of the air-fuel ratio accompanies switching of the combustion system. Known methods for switching an air-fuel ratio include a method that gradually changes the air-fuel ratio so that a torque level difference does not arise. However, according to the aforementioned known method, although a torque level difference is lessened, there is the problem that the desired torque cannot be obtained, and because an air-fuel ratio that is not originally intended is used, there is a deterioration in the emissions. The aforementioned prior art has been proposed as a solution to these problems.

According to the aforementioned prior art, at a time of switching from stratified combustion to homogeneous combustion, the target equivalence ratio is switched in a step manner together with the target air amount (target cylinder intake air amount). More specifically, at the same time as the target equivalence ratio is increased in a step manner, the target air amount is decreased in a step manner so that the torque is constant. However, because the actual air amount lags relative to the target air amount, the fuel amount that is decided based on the target equivalence ratio after switching of the combustion system is in excess of an amount necessary to maintain the torque at a constant amount. In the aforementioned prior art, the excess of the fuel amount is balanced with the retardation of the ignition timing to avoid an increase in torque while switching the equivalence ratio with favorable responsiveness in response to switching of the combustion system.

Further, according to the aforementioned prior art, at a time of switching from homogeneous combustion to stratified combustion, only the target air amount is switched in a step manner before switching the target equivalence ratio in a step manner More specifically, only the target air amount is increased in a step manner to increase the air amount in advance, and a target equivalence ratio is decreased in a step manner at a timing at which the actual air amount reaches the target air amount. That is, during a period in which the air amount is increasing with a delay relative to the target air amount, the target equivalence ratio is maintained at the ratio that is used prior to switching of the combustion system. However, when the fuel amount is decided based on the target equivalence ratio prior to switching of the combustion system, the fuel amount is in excess of an amount necessary to maintain the torque at a constant amount. Therefore, in the aforementioned prior art, an increase in the torque prior to switching of the combustion system is avoided by balancing the excess of the fuel amount with the retardation of the ignition timing.

In this connection, in the aforementioned prior art, switching of the combustion system is determined based on the operating state of the internal combustion engine. A specific example of a switching determination that is made based on the operating state is described in paragraph [0042] of the aforementioned patent literature. The aforementioned paragraph [0042] includes the description that "In the case of performing direct fuel injection in a spark-ignition type engine such as a gasoline engine to thereby switch between stratified combustion and homogeneous combustion, operating ranges exist in which homogeneous lean-burn combustion cannot be used, such as when idling or in an extremely low load operating state. If a request to switch from stratified combustion to homogeneous combustion is generated as a result of application of a high load such as by an air conditioning system in these operating ranges, it is necessary to switch from ultra-lean stratified combustion at an air-fuel ratio of 30 or more to homogeneous stoichiometric combustion at the theoretical air-fuel ratio". Further, as described in paragraph [0039] therein, according to the aforementioned prior art the target torque is maintained at a constant amount when switching the combustion system. In addition, as described in paragraph [0041] therein, switching of the combustion system in a state in which the torque is kept constant is achieved by retarding the ignition timing to avoid an increase in the torque due to an excess in the fuel amount. As will be apparent from the contents of the aforementioned official gazette, the above described prior art is technology that relates to switching control for a combustion system in a steady state in which the target torque is made constant.

When air-fuel ratio switching control for switching from operation according to the theoretical air-fuel ratio to operation according to an air-fuel ratio that is leaner than the theoretical air-fuel ratio or for performing switching in the opposite direction is considered, it is found that such switching control may be performed not only in a steady state but also in a transient state. For example, in the case of an internal combustion engine in which operation according to a leaner air-fuel ratio than the theoretical air-fuel ratio is possible, even when operation according to the theoretical air-fuel ratio must be selected in a high load region, if the torque is to be decreased in response to a deceleration request from the driver, the operation mode can be switched to operation according to a leaner air-fuel ratio than the theoretical air-fuel ratio. Conversely, even when operation according to a leaner air-fuel ratio than the theoretical air-fuel ratio is selected in a low-to-medium load region, if the torque is to be increased in response to an acceleration request from the driver, in some cases the necessity arises to switch the operation mode to operation according to the theoretical air-fuel ratio.

As described in relation to the aforementioned prior art, in the case of control for switching the air-fuel ratio in a steady state, it is desirable to switch the air-fuel ratio with favorable responsiveness while maintaining the torque at a constant level. Similarly, with respect to the control for switching the air-fuel ratio in a transient state, it is desirable to switch the air-fuel ratio with favorable responsiveness while smoothly increasing or decreasing the output torque of the internal combustion engine in accordance with an increase or decrease in the requested torque that is requested by the driver through operation of an accelerator pedal. However, it is not easy to apply the aforementioned prior art to control for switching the air-fuel ratio in a transient state. This is because the aforementioned patent literature only describes a technique for switching the air-fuel ratio (equivalence ratio) that is based on the premise that the torque is kept constant, and does not include any description with regard to a technique for switching the air-fuel ratio with favorable responsiveness while smoothly decreasing or increasing the torque.

Note that technology disclosed in JP2008-038865A can be mentioned as an example of technology for suppressing the occurrence of torque shock when switching the operation mode between operation according to a theoretical air-fuel ratio and operation according to an air-fuel ratio that is leaner than the theoretical air-fuel ratio. However, the technology disclosed in the aforementioned JP2008-038865A is also technology that is designed for switching the air-fuel ratio with favorable responsiveness while keeping the torque constant, and there is no description therein with regard to a technique for switching the air-fuel ratio with favorable responsiveness while smoothly decreasing or increasing the torque at a time of transient operation. Although JP2010-223122A discloses technology that relates to torque demand control for determining operation amounts of respective actuators in accordance with the requested torque, there is no description therein with respect to switching of the air-fuel ratio.

CITATION LIST

Patent Literature

Patent Literature 1: JP11-22609A
Patent Literature 2: JP2010-223122A
Patent Literature 3: JP2008-038865A

SUMMARY OF INVENTION

The present invention has been made in view of the above described problem, and an object of the present invention is, in an internal combustion engine that is configured to be capable of switching an air-fuel ratio that is used for operation between at least two air-fuel ratios, to switch the air-fuel ratio with favorable responsiveness while smoothly changing the torque in accordance with a request of a driver.

First, a first solution with respect to the above described problem that was devised in the process of creating the present invention will be described. The first solution is a technical concept relating to control of an internal combustion engine that includes a first actuator which changes an amount of air drawn into a cylinder (cylinder intake air amount; hereunder referred to simply as "air amount"), a second actuator which supplies fuel into a cylinder, and a third actuator which ignites an air-fuel mixture in a cylinder, and that is configured to be capable of selecting between operation according to a first air-fuel ratio and operation according to a second air-fuel ratio that is leaner than the first air-fuel ratio. The first solution can be applied to the configuration of a control device, and can also be applied to procedures of a control method.

According to the first solution, a requested torque and a predetermined reference value for a torque are compared. The requested torque is a torque that the driver requests with respect to the internal combustion engine, and is calculated based on a signal that is responsive to the degree of opening of an accelerator pedal. Although the reference value for the torque may be a fixed value, preferably the reference value appropriately changes in accordance with the engine speed or another condition. During a period in which the requested torque is greater than the reference value, a first operation mode in which operation is performed according to the first air-fuel ratio is selected as the operation mode, and if the requested torque decreases and becomes less than the reference value, switching of the operation mode from the first operation mode to a second operation mode in which operation is performed according to the second air-fuel ratio is performed. Further, the second operation mode is selected as the operation mode during a period in which the requested torque is less than the reference value, and if the requested torque increases and becomes greater the reference value, switching of the operation mode from the second operation mode to the first operation mode is performed.

In a case where the operation mode is switched from the first operation mode to the second operation mode because of a decrease in the requested torque, switching of the target air-fuel ratio from the first air-fuel ratio to the second air-fuel ratio is performed in response to switching of the operation mode. However, prior to switching of the target air-fuel ratio from the first air-fuel ratio to the second air-fuel ratio, a value of a parameter that is used to calculate a target air amount for achieving the requested torque is changed. The aforementioned parameter is a parameter that provides a conversion efficiency of the air amount to torque, and the target air amount is back-calculated from the requested torque using the parameter. The parameter is changed to a value that lowers the conversion efficiency of the air amount to torque in response to switching of the operation mode. A parameter corresponding to the air-fuel ratio can be mentioned as an example of the parameter. In this case, switching of the value of the parameter from a value corresponding to the first air-fuel ratio to a value corresponding to the second air-fuel ratio is performed at the time point at which the operation mode is switched from the first operation mode to the second operation mode.

A time point at which a fixed time period elapses after the value of the parameter is changed in response to switching of the operation mode from the first operation mode to the second operation mode may be adopted as the timing for switching the target air-fuel ratio from the first air-fuel ratio to the second air-fuel ratio. Further, a time point at which a difference between the target air amount and an estimated air amount becomes equal to or less than a threshold value after the value of the parameter is changed in response to switching of the operation mode from the first operation mode to the second operation mode may also be adopted as the aforementioned timing.

On the other hand, in a case where the operation mode is switched from the second operation mode to the first operation mode because of an increase in the requested torque, switching of the target air-fuel ratio from the second air-fuel ratio to the first air-fuel ratio is performed in response to the switching of the operation mode. In this case, switching of the target air-fuel ratio is performed simultaneously with switching of the operation mode, and in addition, changing of the value of the parameter to be used for calculating the target air amount is also performed at the same time. At this time, the parameter is changed to a value that raises the conversion efficiency of the air amount to torque. If the parameter is a parameter that corresponds to the air-fuel ratio, switching of the value of the parameter from a value corresponding to the second air-fuel ratio to a value corresponding to the first air-fuel ratio is performed at the time point at which the operation mode is switched from the second operation mode to the first operation mode.

The three kinds of actuators are subjected to coordinated operations based on the target air amount and target air-fuel ratio determined by the above described processing. First, an operation amount of the first actuator is determined based on the target air amount, and operation of the first actuator is performed in accordance with the operation amount that is determined. Further, a fuel supply amount is determined based on the target air-fuel ratio, and operation of the second actuator is performed in accordance with the fuel supply amount that is determined. Furthermore, an ignition timing for achieving the requested torque is determined based on the requested torque and a torque that is estimated based on the operation amount of the first actuator and the target air-fuel ratio, and operation of the third actuator is performed in accordance with the determined ignition timing.

The foregoing is an outline of the first solution. While it has been confirmed that the above described object can generally be achieved by the first solution, it has been also found that there is a possibility of a certain amount of fluctuation arising in the actual air-fuel ratio after switching the target air-fuel ratio. According to the first solution, in deceleration, the air amount is increased to an air amount that is in accordance with the second air-fuel ratio prior to switching the target air-fuel ratio, and in acceleration the air amount is decreased to an air amount that is in accordance with the first air-fuel ratio at the same time that switching of the target air-fuel ratio is performed. However, the fact that the rate of change in the air amount at such time is fast causes a certain amount of fluctuation to arise in the actual air-fuel ratio. The fact that the rate of change in the air amount is fast means that the flow rate of air drawn into the cylinders from an intake port changes by a large amount. A large change in the flow rate of the intake air causes fluctuations in the evaporation amount of fuel adhering to the intake port, and the influence of such fluctuations causes a certain amount of fluctuation to arise in the actual air-fuel ratio after switching the target air-fuel ratio. Fluctuations in the actual air-fuel ratio lead to fluctuations in the torque, and there is a possibility that such fluctuations will impair the realization of a smooth decrease or increase in torque that is consistent with a deceleration request or an acceleration request of the driver.

Having considered such concerns regarding the first solution, the present invention has been proposed as a more favorable solution (second solution) with respect to the above described object.

The present invention can be applied to the configuration of a control device for an internal combustion engine. Hereunder, an overview of a control device for an internal combustion engine according to the present invention will be described. However, as will be apparent from the contents of the present invention described below, the present invention can be applied to procedures of a method for controlling an internal combustion engine, and also to an algorithm of a program that is executed by a control device.

A control device according to the present invention has three kinds of actuators. A control object of the control device is an internal combustion engine that is configured to be capable of selecting between operation in a first air-fuel ratio and operation in a second air-fuel ratio that is leaner than the first air-fuel ratio. The three kinds of actuators are a first actuator that changes an air amount, a second actuator that supplies fuel into a cylinder, and a third actuator that ignites an air-fuel mixture in a cylinder. The first actuator includes, for example, a throttle and a variable valve timing device that varies a valve timing of an intake valve, and if the internal combustion engine is a supercharged engine, a supercharging characteristic varying actuator that varies a supercharging characteristic of a supercharger, specifically, a variable nozzle or a waste gate valve or the like, is also categorized as the first actuator. The second actuator is, specifically, an injector that injects fuel. For example, a port injector that injects fuel into an intake port, and an in-cylinder injector that directly injects fuel into a cylinder are categorized as the second actuator. The third actuator is, specifically, an ignition device. The control device according to the present invention performs integrated control of an air amount, a fuel supply amount and an ignition timing of an internal combustion engine by means of coordinated operations of these three kinds of actuators.

The control device according to the present invention may be embodied by a computer. More specifically, the control device according to the present invention may be constituted by a computer that is equipped with a memory in which a program that describes processing for realizing various functions is stored, and a processor that reads the program from the memory and executes the program. Functions that the control device according to the present invention is equipped with include, as functions for determining a target air amount and a target air-fuel ratio to be used in coordinated operations of the three kinds of actuators described above, a requested torque reception function, a reference value calculation function, a target air-fuel ratio switching function, a target air amount calculation function, and a parameter value changing function.

According to the requested torque reception function, a requested torque with respect to the internal combustion engine is received. The requested torque is calculated based on a signal that is responsive to the degree of opening of an accelerator pedal that is operated by the driver. In a case where the driver outputs a deceleration request with respect to the internal combustion engine, a requested torque is obtained that decreases in accordance with the speed at which the driver releases the accelerator pedal. In a case where the driver outputs an acceleration request with respect to the internal combustion engine, a requested torque is obtained that increases in accordance with the speed at which the driver depresses the accelerator pedal.

According to the reference value calculation function, a first reference value with respect to the torque is calculated based on the engine speed of the internal combustion engine. Next, an air amount with which the first reference value can be achieved under the second air-fuel ratio is calculated, and a second reference value with respect to the torque is calculated based on the air amount and the first air-fuel ratio. That is, a value of the torque that will be obtained if the air-fuel ratio is adjusted to the first air-fuel ratio at an air amount with which the first reference value can be achieved under the second air-fuel ratio is the second reference value. The first reference value and second reference value are reference values that are used when switching the operation mode, and the control device according to the present invention compares a requested torque that decreases in accordance with a deceleration request of the driver with these reference values, and executes switching of the operation mode based on the comparison result.

According to the target air-fuel ratio switching function, the target air-fuel ratio is set to the first air-fuel ratio in response to the requested torque being greater than the first reference value. Further, the target air-fuel ratio is switched from the first air-fuel ratio to the second air-fuel ratio in response to a decrease in the requested torque to a value that is equal to or less than the first reference value. That is, in a case where the requested torque decreases in accordance with a deceleration request of the driver, the target air-fuel ratio is maintained at the first air-fuel ratio during a period in which the requested torque is greater than the first reference value, and the target air-fuel ratio is switched to the second air-fuel ratio when the requested torque decreases to a value that is equal to or less than the first reference value. According to the control device of the present invention, the requested torque becoming less than the first reference value is used as a trigger for switching the operation mode from the first operation mode in which operation is performed according to the first air-fuel ratio to the second operation mode in which operation is performed according to the second air-fuel ratio. The first reference value is set to the most favorable value from the viewpoint of fuel consumption performance and exhaust gas performance with respect to the relation with the engine speed of the internal combustion engine.

According to the target air amount calculation function, a target air amount for achieving the requested torque is back-calculated from the requested torque. A parameter that provides a conversion efficiency of the air amount to torque is used for calculating the target air amount. The value of the parameter is variable, and is changed by the parameter value changing function. According to the parameter value changing function, in response to a decrease in the requested torque to a value that is equal to or less than the second reference value, the value of the parameter begins to be changed in a direction that lowers the conversion efficiency. Further, as the requested torque further decreases from the second reference value towards the first reference value, the value of the parameter is gradually changed in a direction that lowers the conversion efficiency.

In a case where the conversion efficiency of the air amount to torque is made constant, if the requested torque decreases, the target air amount will also decrease in accordance therewith. However, according to the control device of the present invention, by changing the value of a parameter that provides the conversion efficiency as described above, a decrease in the target air amount is suppressed during a period until the requested torque decreases from the second reference value to the first reference value. In a case where the requested torque becomes less than the first reference value and the operation mode is switched to the second operation mode, in the operation according to the second air-fuel ratio after switching, an air amount is required that is greater than the air amount required for operation according to the first air-fuel ratio. According to the control device of the present invention, because a decrease in the target air amount is suppressed until the time point at which switching is performed, it is not necessary to increase the target air amount by a large amount at the time point at which switching is performed. Furthermore, since the value of the parameter is gradually changed in a direction that lowers the conversion efficiency, a large change in the target air amount is also suppressed during a period in which the requested torque decreases as far as the first reference value.

A parameter corresponding to the air-fuel ratio is mentioned as an example of a parameter that is used for calculating the target air amount. The leaner that the air-fuel ratio becomes relative to the theoretical air-fuel ratio, the greater the decrease will be in the amount of torque that is generated with the same air amount. Therefore the parameter corresponding to the air-fuel ratio corresponds to the parameter that provides the conversion efficiency of the air amount to torque. When using the parameter corresponding to the air-fuel ratio to calculate the target air amount, the value of the parameter is set to a value that corresponds to the first air-fuel ratio in response to the requested torque being greater than the second reference value. That is, during a period in which the requested torque is greater than the second reference value, the target air-fuel ratio is calculated based on the requested torque on the premise that the air-fuel ratio is the first air-fuel ratio. Further, in response to the requested torque decreasing to a value that is equal to or less than the second reference value, the value of the parameter starts to be changed from a value corresponding to the first air-fuel ratio. Furthermore, as the requested torque decreases from the second reference value to the first reference value, the value of the parameter is gradually changed from a value corresponding to the first air-fuel ratio to a value corresponding to the second air-fuel ratio. That is, in a case where the requested torque decreased to a value that is equal to or less than the second reference value, prior to the target air-fuel ratio being switched from the first air-fuel ratio to the second air-fuel ratio, the air-fuel ratio that is used for calculating the target air amount is gradually changed from the first air-fuel ratio to the second air-fuel ratio.

A parameter corresponding to the ignition timing is also be mentioned as an example of a parameter that is used for calculating the target air amount. The greater the degree to which the ignition timing is retarded relative to the optimal ignition timing, the greater the decrease will be in the amount of torque that is generated with the same air amount. Therefore the parameter corresponding to the ignition timing corresponds to the parameter that provides a conversion efficiency of the air amount to torque. When the parameter corresponding to the ignition timing is used to calculate the target air amount, in response to the requested torque being greater than the second reference value, the value of the parameter is set to a value that corresponds to the optimal ignition timing. That is, during a period in which the requested torque is greater than the second reference value, the target air-fuel ratio is calculated based on the requested torque on the premise that the ignition timing is the optimal ignition timing. Further, in response to the requested torque decreasing to a value that is equal to or less than the second reference value, the value of the parameter starts to be changed from a value corresponding to the optimal ignition timing. Furthermore, during a period until the requested torque decreases from the second reference value to the first reference value, the value of the parameter is gradually changed to a value corresponding to a more retarded ignition timing in accordance with a proportion of the requested torque relative to the second reference value. That is, in a case where the requested torque decreased to a value that is equal to or less than the second reference value, prior to the target air-fuel ratio being switched from the first air-fuel ratio to the second air-fuel ratio, the ignition timing that serves as a basis for calculation of the target air amount is gradually retarded from the optimal ignition timing. Note that, in this case the target air-fuel ratio may be used as an air-fuel ratio that serves as a basis for calculation of the target air amount.

Preferably, the parameter corresponding to the ignition timing is expressed as a coefficient by which the requested torque is divided. If the parameter is expressed by such a coefficient, the value of the parameter is set to 1 in response to the requested torque being greater than the second reference value. Further, the value of the parameter starts to be decreased from 1 in response to a decrease in the requested torque to a value that is equal to or less than the second reference value, and during a period in which the requested torque decreases from the second reference value to the first reference value the proportion of the requested torque relative to the second reference value is calculated as the value of the parameter. In a case where the value of the parameter is the proportion of the requested torque relative to the second reference value, a value obtained by dividing the requested torque by the parameter matches the second reference value. Hence, when calculating the target air amount using the parameter as the coefficient, during a period in which the requested torque decreases from the second reference value to the first reference value, a value obtained by converting the second reference value to an air amount in place of the requested torque is calculated as the target air amount.

The control device according to the present invention subjects the three kinds of actuators to coordinated operations based on the target air amount and target air-fuel ratio determined by the above described processing. Functions that the control device of the present invention is equipped with include a first actuator control function, a second actuator control function and a third actuator control function as functions for performing coordinated operations based on the target air amount and target air-fuel ratio.

According to the first actuator control function, an operation amount of the first actuator is determined based on the target air amount. Operation of the first actuator is then performed in accordance with the operation amount that is determined. The actual air amount changes so as to track the target air amount according to the operation of the first actuator. According to the control device of the present invention, a large change in the target air amount is suppressed during a period until the requested torque decreases and the operation mode is switched, and a large change in the target air amount is also suppressed with respect to before and after switching of the operation mode. Consequently, the behavior with regard to the rate of change in the air amount before and after switching of the target air-fuel ratio is stabilized.

According to the second actuator control function, a fuel supply amount is determined based on the target air-fuel ratio. Operation of the second actuator is then performed in accordance with the fuel supply amount that is determined. According to the control device of the present invention, because the behavior with regard to the rate of change in the air amount is stabilized, fluctuations in the actual air-fuel ratio in deceleration that are a concern in the first solution are suppressed.

According to the third actuator control function, an ignition timing for achieving the requested torque is determined based on a torque that is estimated based on the operation amount of the first actuator and the target air-fuel ratio, and the requested torque. Operation of the third actuator is then performed in accordance with the determined ignition timing. The actual air amount is estimated based on the operation amount of the first actuator, and the torque is estimated based on the estimated air amount and the target air-fuel ratio. Operation of the third actuator is performed so as to correct an excess of the estimated torque with respect to the requested torque by means of the ignition timing. According to the control device of the present invention, because fluctuations in the actual air-fuel ratio with respect to the target air-fuel ratio are suppressed, the requested torque can be accurately achieved by the ignition timing that is determined based on the target air-fuel ratio, and the torque can be smoothly decreased in accordance with a deceleration request of the driver.

The above described functions that the control device of the present invention is equipped with are favorable functions for satisfying requirements with respect to both drivability and controllability of the air-fuel ratio in deceleration. Preferably, the control device of the present invention is further equipped with the following functions to satisfy requirements with respect to both drivability and controllability of the air-fuel ratio in acceleration. Note that, the following two preferable embodiments are available as functions adapted to a time of acceleration.

According to a first preferable embodiment, the reference value calculation function includes a function for calculating a third reference value with respect to the torque based on an air amount with which the first reference value can be achieved under the first air-fuel ratio, and the second air-fuel ratio. When the air amount is an amount with which the first reference value can be achieved under the first air-fuel ratio, the value of the torque that can be obtained if the air-fuel ratio is adjusted to the second air-fuel ratio is the third reference value. The third reference value is a reference value that is used for switching the operation mode, and according to the first preferable embodiment a requested torque that increases in accordance with an acceleration request of the driver is compared with the third reference value, and switching of the operation mode is executed based on the comparison result.

According to the first preferable embodiment, an additional function is also included in each of the target air-fuel ratio switching function and the parameter value changing function. According to an additional function included in the target air-fuel ratio switching function, the target air-fuel ratio is set to the second air-fuel ratio in response to the requested torque being less than the third reference value. Further, in response to an increase in the requested torque to a value that is equal to or greater than the third reference value, the target air-fuel ratio is switched from the second air-fuel ratio to the first air-fuel ratio. That is, in a case where the requested torque increases in accordance with an acceleration request of the driver, the target air-fuel ratio is maintained at the second air-fuel ratio during a period in which the requested torque is less than the third reference value, and the target air-fuel ratio is then switched to the first air-fuel ratio upon the requested torque increasing to a value that is equal to or greater than the third reference value. According to the first preferable embodiment, the requested torque becoming higher than the third reference value is used as a trigger for switching the operation mode from the second operation mode in which operation is performed according to the second air-fuel ratio to the first operation mode in which operation is performed according to the first air-fuel ratio.

According to an additional function included in the parameter value changing function, in response to an increase in the requested torque to a value that is equal to or greater than the third reference value, the value of the parameter begins to be changed in a direction that raises the conversion efficiency. Further, as the requested torque increases further from the third reference value towards the first reference value, the value of the parameter is gradually changed in a direction that raises the conversion efficiency.

In a case where the conversion efficiency of the air amount to torque is made constant, when the requested torque becomes greater than the third reference value and the operation mode is switched to the first operation mode, the air amount that is required for the operation according to the first air-fuel ratio after switching decreases in a step manner relative to the air amount that is required for the operation according to the second air-fuel ratio. However, it is difficult to realize such a kind of stepwise decrease in the air amount through the operation of an actuator. According to the control device of the present invention, by changing the value of the parameter that provides the conversion efficiency as described above, a stepwise decrease in the target air amount immediately after the operation mode is switched is avoided, and a large change in the target air amount during a period in which the requested torque increases from the third reference value to the first reference value is also suppressed. Further, because the behavior with regard to the rate of change in the air amount after switching of the target air-fuel ratio is stabilized, fluctuations in the actual air-fuel ratio in acceleration that are a concern in the first solution are suppressed.

According to the first preferable embodiment, a parameter corresponding to the air-fuel ratio can be used as a parameter that is used for calculating the target air amount. In the case of using the parameter corresponding to the air-fuel ratio to calculate the target air amount, the value of the parameter is set to a value corresponding to the second air-fuel ratio in response to the requested torque being less than the third reference value. That is, during a period in which the requested torque is less than the third reference value, the target air-fuel ratio is calculated based on the requested torque on the premise that the air-fuel ratio is the second air-fuel ratio. In response to the requested torque increasing to a value that is equal to or greater than the third reference value, the value of the parameter begins to be changed from a value corresponding to the second air-fuel ratio. Furthermore, as the requested torque increases further from the third reference value towards the first reference value, the value of the parameter is gradually changed from a value corresponding to the second air-fuel ratio to a value corresponding to the first air-fuel ratio. That is, in a case where the requested torque increased to a value that is equal to or greater than the third reference value, while on one hand the target air-fuel ratio is switched in a step manner from the second air-fuel ratio to the first air-fuel ratio, on the other hand the air-fuel ratio that is used to calculate the target air amount is gradually changed from the second air-fuel ratio to the first air-fuel ratio.

A parameter corresponding to the ignition timing is mentioned as an example of a parameter that is used in the first preferable embodiment. When the parameter corresponding to the ignition timing is used to calculate the target air amount, in response to the requested torque being less than the third reference value, the value of the parameter is set to a value that corresponds to the optimal ignition timing. That is, during a period in which the requested torque is less than the third reference value, the target air-fuel ratio is calculated based on the requested torque on the premise that the ignition timing is the optimal ignition timing. Further, in response to the requested torque increasing to a value that is equal to or greater than the third reference value, the value of the parameter is decreased in a step manner to a value corresponding to an ignition timing that is retarded relative to the optimal ignition timing. Furthermore, during a period until the requested torque increases from the third reference value to the first reference value, the value of the parameter is gradually changed in accordance with the proportion of the requested torque relative to the first reference value. That is, in a case where the requested torque increased to a value that is equal to or greater than the third reference value, accompanying switching of the target air-fuel ratio in a step manner from the second air-fuel ratio to the first air-fuel ratio, the ignition timing that serves as a basis for calculation of the target air amount is temporarily retarded by a large amount and thereafter is gradually advanced as the requested torque increases up to the first reference value. Note that the target air-fuel ratio may be used as an air-fuel ratio that serves as a basis for calculation of the target air amount.

Preferably, the parameter corresponding to the ignition timing is expressed as a coefficient by which the requested torque is divided. If the parameter is expressed by such a coefficient, the value of the parameter is set to 1 in response to the requested torque being less than the third reference value. Further, the value of the parameter is decreased in a step manner from 1 in response to an increase in the requested torque to a value that is equal to or greater than the third reference value, and during a period in which the requested torque increases from the third reference value to the first reference value the proportion of the requested torque relative to the first reference value is calculated as the value of the parameter. In a case where the value of the parameter is the proportion of the requested torque relative to the first reference value, a value obtained by dividing the requested torque by the parameter matches the first reference value. Hence, when calculating the target air amount using the parameter as the coefficient, during a period in which the requested torque increases from the third reference value to the first reference value, a value obtained by converting the first reference value to an air amount in place of the requested torque is calculated as the target air amount.

Next, a second preferable embodiment will be described. In the second preferable embodiment, the first reference value is used for switching the operation mode. The requested torque that increases in accordance with an acceleration request of the driver is compared with the first reference value, and switching of the operation mode is executed based on the comparison result.

According to the second preferable embodiment, an additional function is included in each of the target air-fuel ratio switching function and the parameter value changing function. According to the additional function included in the target air-fuel ratio switching function, the target air-fuel ratio is set to the second air-fuel ratio in response to the requested torque being less than the first reference value. Further, in response to an increase in the requested torque to a value that is equal to or greater than the first reference value, the target air-fuel ratio is switched from the second air-fuel ratio to the first air-fuel ratio. That is, in a case where the requested torque increases in accordance with an acceleration request of the driver, the target air-fuel ratio is maintained at the second air-fuel ratio during a period in which the requested torque is less than the first reference value, and the target air-fuel ratio is then switched to the first air-fuel ratio upon the requested torque increasing to a value that is equal to or greater than the first reference value. According to the second preferable embodiment, the requested torque becoming greater than the first reference value is used as a trigger for switching the operation mode from the second operation mode in which operation is performed according to the second air-fuel ratio to the first operation mode in which operation is performed according to the first air-fuel ratio.

According to the additional function included in the parameter value changing function, in response to the requested torque increasing to a value that is equal to or greater than the first reference value, the value of the parameter begins to be changed in a direction that raises the conversion efficiency. Further, as the requested torque increases from the first reference value towards the second reference value, the value of the parameter is gradually changed in a direction that raises the conversion efficiency. In the second preferable embodiment, preferably a parameter corresponding to the ignition timing is adopted as a parameter that is used to calculate the target air amount. The value of the parameter is set to a value corresponding to the optimal ignition timing in response to the requested torque being less than the first reference value. That is, during a period in which the requested torque is less than the first reference value, the target air-fuel ratio is calculated based on the requested torque on the premise that the ignition timing is the optimal ignition timing. Further, in response to an increase in the requested torque to a value that is equal to or greater than the first reference value, the value of the parameter is decreased in a step manner to a value corresponding to an ignition timing that is retarded relative to the optimal ignition timing. Furthermore, during a period in which the requested torque increases from the first reference value to the second reference value, the value of the parameter is gradually changed in accordance with the proportion of the requested torque relative to the first reference value. That is, in a case where the requested torque increased to a value that is equal to or greater than the first reference value, accompanying switching of the target air-fuel ratio in a step manner from the second air-fuel ratio to the first air-fuel ratio, the ignition timing that serves as a basis for calculation of the target air amount is temporarily retarded by a large amount and thereafter is gradually advanced as the requested torque increases up to the second reference value.

In the second preferable embodiment, the parameter corresponding to the ignition timing is preferably expressed as a coefficient by which the requested torque is divided. If the parameter is expressed by such a coefficient, the value of the parameter is set to 1 in response to the requested torque being less than the first reference value. Further, the value of the parameter is decreased in a step manner from 1 in response to an increase in the requested torque to a value that is equal to or greater than the first reference value, and during a period in which the requested torque increases from the first reference value to the second reference value, the proportion of the requested torque relative to the second reference value is calculated as the value of the parameter. In a case where the value of the parameter is the proportion of the requested torque relative to the second reference value, a value obtained by dividing the requested torque by the parameter matches the second reference value. Hence, when calculating the target air amount using the parameter as a coefficient, during a period in which the requested torque increases from the first reference value to the second reference value, a value obtained by converting the second reference value to an air amount in place of the requested torque is calculated as the target air amount.

In a case where the conversion efficiency of the air amount to torque is made constant, when the requested torque becomes higher than the first reference value and the operation mode is switched to the first operation mode, the air amount that is required for the operation according to the first air-fuel ratio after switching decreases in a step manner relative to the air amount that is required for the operation according to the second air-fuel ratio. However, it is difficult to realize such a kind of stepwise decrease in the air amount through the operation of an actuator. According to the second preferable embodiment, by changing the value of the parameter that provides the conversion efficiency as described above, a stepwise decrease in the target air amount immediately after the operation mode is switched is avoided, and a large change in the target air amount during a period in which the requested torque increases from the first reference value to the second reference value is also suppressed. In particular, in a case where a parameter corresponding to the ignition timing is used as the parameter, and the parameter is expressed as a coefficient by which the requested torque is divided, the target air amount can be kept approximately constant during a period in which the requested torque increases from the first reference value to the second reference value. As a result, because the behavior with regard to the rate of change in the air amount after switching of the target air-fuel ratio is stabilized, fluctuations in the actual air-fuel ratio in acceleration that are a concern in the first solution are suppressed.

DESCRIPTION OF EMBODIMENTS

Embodiment 1

Hereunder, Embodiment 1 of the present invention is described with reference to the drawings.

An internal combustion engine (hereinafter, referred to as "engine") which is a control object in the present embodiment is a spark-ignition type, four-cycle reciprocating engine. Further, the engine is a so-called "lean-burn engine" that is configured to be capable of selecting between a stoichiometric mode (first operation mode) that performs operation according to a theoretical air-fuel ratio and a lean mode (second operation mode) that performs operation according to an air-fuel ratio that is leaner than the theoretical air-fuel ratio as the operation mode of the engine.

An ECU (electrical control unit) mounted in the vehicle controls operations of the engine by actuating various kinds of actuators that are provided in the engine. The actuators actuated by the ECU include a throttle and a variable valve timing device (hereunder, referred to as "VVT") as first actuators that change an air amount, an injector as a second actuator that supplies fuel into a cylinder, and an ignition device as a third actuator that ignites an air-fuel mixture in a cylinder. The VVT is provided with respect to an intake valve. The injector is provided in an intake port. The ECU actuates these actuators to control operation of the engine. Control of the engine by the ECU includes switching of the operation mode from the stoichiometric mode to the lean mode, or from the lean mode to the stoichiometric mode.

Figure 1:
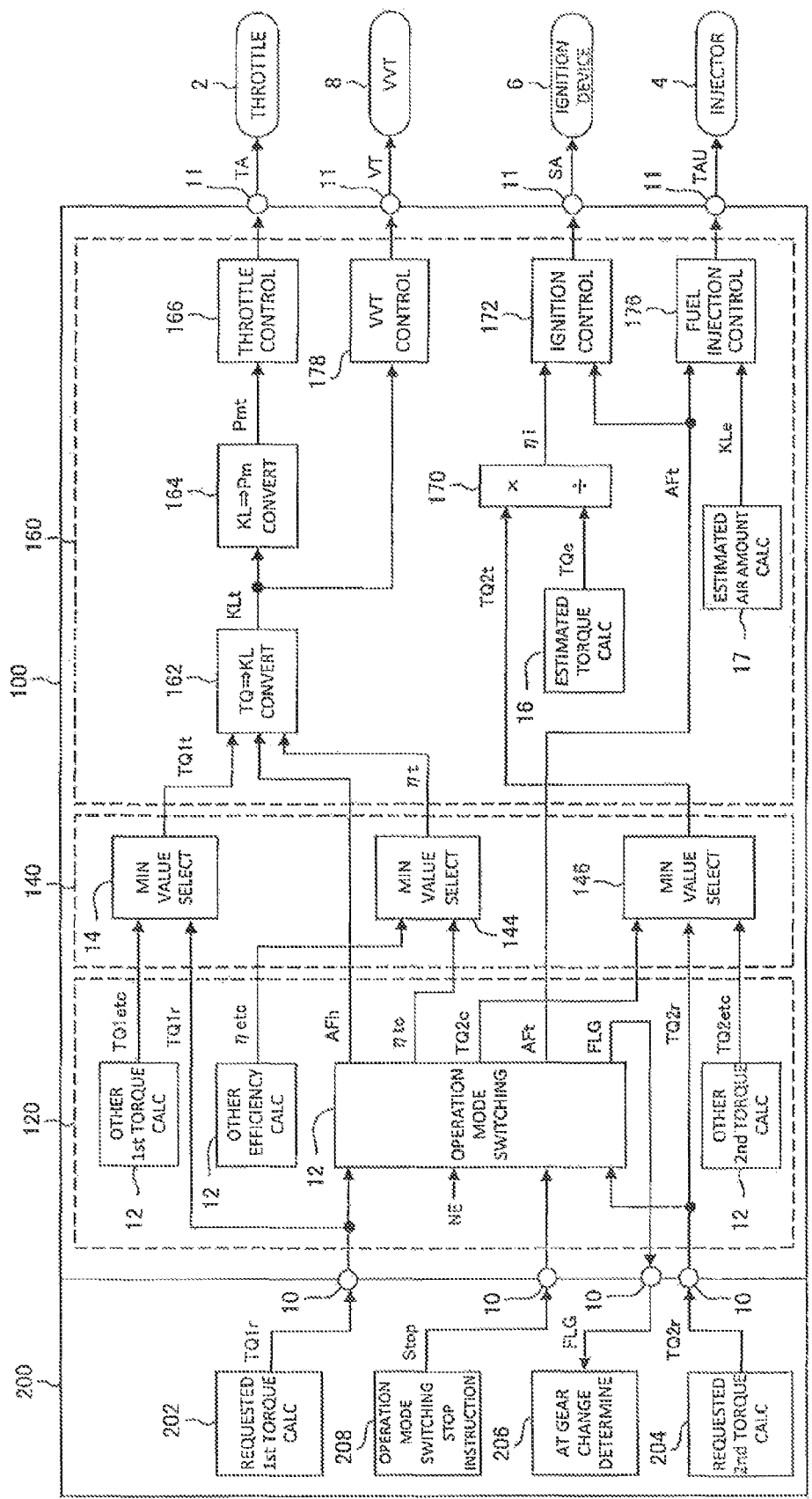
FIG. 1 is a block diagram illustrating the logic of a control device according to Embodiment 1 of the present invention.

In FIG. 1, the logic of the ECU according to the present embodiment is illustrated in a block diagram. The ECU includes an engine controller 100 and a powertrain manager 200. The engine controller 100 is a control device that directly controls the engine, and corresponds to the control device according to the present invention. The powertrain manager 200 is a control device that performs integrated control of the entire driving system that includes the engine, an electronically controlled automatic transmission, and also vehicle control devices such as a VSC and a TRC. The engine controller 100 is configured to control operation of the engine based on signals received from the powertrain manager 200. The engine controller 100 and powertrain manager 200 are each realized by software. More specifically, the respective functions of the engine controller 100 and the powertrain manager 200 are realized in the ECU by reading programs stored in a memory and executing the programs using a processor. Note that, in a case where the ECU is equipped with a multi-core processor, the engine controller 100 and the powertrain manager 200 can be allocated to different cores or groups of cores, respectively.

In the block showing the powertrain manager 200 in FIG. 1, among various functions that the powertrain manager 200 is equipped with, some of the functions relating to control of the engine are represented by blocks. An arithmetic unit is allocated to each of these blocks. A program corresponding to each block is prepared in the ECU, and the functions of the respective arithmetic units are realized in the ECU by executing the programs using a processor. Note that, in a case where the ECU is equipped with a multi-core processor, the arithmetic units constituting the powertrain manager 200 can be dispersed and allocated to a plurality of cores.

An arithmetic unit 202 calculates a requested first torque and sends the calculated value to the engine controller 100. In the drawing, the requested first torque is described as "TQ1r". The first torque is a torque of a kind with respect to which the responsiveness required of the engine is not high and which it is sufficient to realize in the near future and need not be realized immediately. The requested first torque is a requested value of the first torque that the powertrain manager 200 requests with respect to the engine, and corresponds to the requested torque in the present invention. A signal corresponding to the state of the opening degree of the accelerator pedal that is output from an unshown accelerator position sensor is input to the arithmetic unit 202. The requested first torque is calculated based on the aforementioned signal. Note that the requested first torque is a shaft torque.

An arithmetic unit 204 calculates a requested second torque and sends the calculated value to the engine controller 100. In the drawing, the requested second torque is described as "TQ2r". The second torque is a torque of a kind with respect to which the urgency or priority is higher than the first torque and for which a high responsiveness is required of the engine. That is, the second torque is of a kind which is required to be realized immediately. The term "responsiveness" used here refers to the responsiveness when the torque is temporarily decreased. The requested second torque is a requested value of the second torque that the powertrain manager 200 requests with respect to the engine. The requested second torque that is calculated by the arithmetic unit 204 includes various kinds of torques requested from the vehicle control system, such as a torque requested for transmission control of the electronically controlled automatic transmission, a torque requested for traction control, and a torque requested for sideslip prevention control. While the first torque is a torque that the engine is required to generate steadily or over an extended period, the second torque is a torque that the engine is required to generate suddenly or during a short period. Therefore, the arithmetic unit 204 outputs a valid value that is in accordance with the magnitude of the torque that it is desired to realize only in a case where an event has actually occurred in which such a torque is required, and outputs an invalid value during a period in which such an event does not occur. The invalid value is set to a value that is larger than the maximum shaft torque that the engine can output.

An arithmetic unit 206 calculates a transmission gear ratio of the automatic transmission, and sends a signal indicating the transmission gear ratio to an unshown transmission controller. The transmission controller is realized as one function of the ECU, similarly to the powertrain manager 200 and the engine controller 100. A flag signal from the engine controller 100 is input to the arithmetic unit 206. In the drawing, the flag signal is described as "FLG". The flag signal is a signal that indicates that the state is one in which switching of the operation mode is being performed. During a period in which the flag signal is "on", the arithmetic unit 206 fixes the transmission gear ratio of the automatic transmission. That is, during a period in which switching of the operation mode is being performed, changing of the transmission gear ratio by the automatic transmission is prohibited so that the operating state of the engine does not change significantly.

In response to a predetermined condition being satisfied, an arithmetic unit 208 sends a stop signal to the engine controller 100 that instructs the engine controller 100 to stop switching of the operation mode. In the drawing, the stop signal is described as "Stop". The predetermined condition is that a request to significantly change the operating state of the engine is output from the powertrain manager 200. For example, the stop signal is output from the arithmetic unit 208 in a case where the transmission gear ratio of the automatic transmission is changed, or a case where a special request relating to the ignition timing or a fuel injection amount is output to the engine for the purpose of warming up a catalyst.

Next, the configuration of the engine controller 100 will be described. Interfaces 101, 102, 103 and 104 are arranged between the engine controller 100 and the powertrain manager 200. The interface 101 corresponds to requested torque reception means in the present invention. The requested first torque is passed to the engine controller 100 at the interface 101. The stop signal is passed to the engine controller 100 at the interface 102. The flag signal is passed to the engine controller 100 at the interface 103. The requested second torque is passed to the engine controller 100 at the interface 104.

In the block illustrating the engine controller 100 in FIG. 1, among the various functions with which the engine controller 100 is equipped, functions relating to coordinated operations of the three kinds of actuators, that is, a throttle 2 and a VVT 8 as first actuators, an injector 4 as a second actuator, and an ignition device 6 as a third actuator are represented with blocks. An arithmetic unit is allocated to each of these blocks. A program corresponding to each block is prepared in the ECU, and the functions of the respective arithmetic units are realized in the ECU by executing the programs using a processor. Note that, in a case where the ECU is equipped with a multi-core processor, the arithmetic units constituting the engine controller 100 can be dispersed and allocated to a plurality of cores.

The configuration of the engine controller 100 is broadly divided into three large arithmetic units 120, 140 and 160. The large arithmetic unit 120 calculates values of various control parameters with respect to the engine. Target values of various control amounts with respect to the engine are included in the control parameters. In addition, a value that is calculated based on a requested value that is sent from the powertrain manager 200, and a value that is calculated within the large arithmetic unit 120 based on information relating to the operating state of the engine are included in the target values. Note that, while a requested value is a value of a control amount that is unilaterally requested from the powertrain manager 200 without taking the state of the engine into consideration, a target value is a value of a control amount that is set based on a realizable range that is decided depending on the state of the engine. The large arithmetic unit 120 is, more specifically, constituted by four arithmetic units 122, 124, 126, and 128.

The arithmetic unit 122 calculates, as control parameters for the engine, a target air-fuel ratio, a virtual air-fuel ratio, a target efficiency for switching and a target second torque for switching. In the drawing, the target air-fuel ratio is described as "AFt", the virtual air-fuel ratio is described as "AFh", the target efficiency for switching is described as "Mc" and the target second torque for switching is described as "TQ2c". The target air-fuel ratio is a target value of the air-fuel ratio to be realized by the engine, and is used for calculating a fuel injection amount. On the other hand, the virtual air-fuel ratio is a parameter that provides a conversion efficiency of an air amount to torque, and is used for calculating a target air amount. The target efficiency for switching is a target value of the ignition timing efficiency for switching of the operation mode, and is used for calculating the target air amount. The term "ignition timing efficiency" refers to the proportion of torque that is actually output with respect to the torque that can be output when the ignition timing is the optimal ignition timing. When the ignition timing is the optimal ignition timing, the ignition timing efficiency is 1 that is the maximum value thereof. Note that the term "optimal ignition timing" fundamentally refers to the MBT (minimum advance for best torque), and when a trace knock ignition timing is set, the term "optimal ignition timing" refers to the ignition timing that is located further on the retardation side among the MBT and the trace knock ignition timing. The target second torque for switching is a target value of the second torque for switching of the operation mode, and is used to switch the calculation of the ignition timing efficiency when switching the operation mode. Switching of the operation mode is executed by combining the values of these control parameters that are calculated with the arithmetic unit 122. The relation between the contents of the processing performed by the arithmetic unit 122 and switching of the operation mode will be described in detail later.

In addition to the requested first torque, the requested second torque, and the stop signal that are received from the powertrain manager 200, various kinds of information relating to the operating state of the engine such as the engine speed is also input to the arithmetic unit 122. Among these various kinds of information, the requested first torque is used as information for determining the timing for switching the operation mode. The requested second torque and the stop signal are used as information for determining whether switching of the operation mode is permitted or prohibited. When the stop signal is input, and when the requested second torque of a valid value is input, the arithmetic unit 122 does not execute processing relating to switching the operation mode. Further, during switching of the operation mode, that is, while executing calculation processing for switching the operation mode, the arithmetic unit 122 sends the aforementioned flag signal to the powertrain manager 200.

The arithmetic unit 124 calculates, as a control parameter for the engine, a torque that is classified as the first torque among torques that are necessary for maintaining the current operating state of the engine or for realizing a scheduled predetermined operating state. In this case, a torque that is calculated by the arithmetic unit 124 is referred to as "other first torque". In the drawing, the other first torque is described as "TQ1etc". A torque that is in a range of variations that are achievable by only control of the air amount among torques that are required in order to maintain a predetermined idling speed in a case where the engine is in an idling state is included in the kinds of the other first torque. The arithmetic unit 124 outputs a valid value only in a case where such a torque is actually required, and calculates an invalid value during a period in which such a torque is not required. The invalid value is set to a value that is greater than the maximum indicated torque that the engine can output.

The arithmetic unit 126 calculates, as a control parameter for the engine, a torque that is classified as the second torque among torques that are necessary for maintaining the current operating state of the engine or for realizing a scheduled predetermined operating state. In this case, a torque that is calculated by the arithmetic unit 126 is referred to as "other second torque". In the drawing, the other second torque is described as "TQ2etc". A torque for which it is necessary to perform control of the ignition timing in order to achieve the relevant torque among torques that are required in order to maintain a predetermined idling speed in a case where the engine is in an idling state is included in the kinds of the other second torque. The arithmetic unit 126 outputs a valid value only in a case where such a torque is actually required, and calculates an invalid value during a period in which such a torque is not required. The invalid value is set to a value that is greater than the maximum indicated torque that the engine can output.

The arithmetic unit 128 calculates, as a control parameter for the engine, an ignition timing efficiency that is necessary for maintaining the current operating state of the engine or for realizing a scheduled predetermined operating state. In this case, an ignition timing efficiency that is calculated by the arithmetic unit 128 is referred to as "other efficiency". In the drawing, the other efficiency is described as "ηetc". An ignition timing efficiency that is necessary for warming up an exhaust purification catalyst when starting the engine is included in the kinds of the other efficiency. The more the ignition timing efficiency is lowered, the less the amount of energy that is converted to torque will be among the energy generated by the combustion of fuel, and thus an amount of energy that is increased by an amount corresponding to the decrease in the energy converted to torque will be discharged to the exhaust passage together with the exhaust gas and used to warm up the exhaust purification catalyst. Note that, during a period in which it is not necessary to realize such efficiency, the efficiency value that is output from the arithmetic unit 128 is held at a value of 1 that is the maximum value.

The requested first torque, the other first torque, the target air-fuel ratio, the virtual air-fuel ratio, the target efficiency for switching, the other efficiency, the requested second torque, the target second torque for switching, and the other second torque are output from the large arithmetic unit 120 configured as described above. These control parameters are input to the large arithmetic unit 140. Note that, although the requested first torque and the requested second torque that are received from the powertrain manager 200 are shaft torques, correction of these torques into indicated torques is performed at the large arithmetic unit 120. Correction of the requested torque to the indicated torque is performed by adding or subtracting a friction torque, an auxiliary driving torque and a pump loss to or from the requested torque. Note that, torques such as the target second torque for switching that are calculated within the large arithmetic unit 120 are each calculated as an indicated torque.

Next, the large arithmetic unit 140 will be described. As described above, various engine control parameters are sent to the large arithmetic unit 140 from the large arithmetic unit 120. Among these, the requested first torque and the other first torque are requests with respect to control amounts that belong to the same category, and these cannot be realized simultaneously. Likewise, the requested second torque, the other second torque and the target second torque for switching are requests with respect to control amounts that belong to the same category, and these cannot be realized simultaneously. Similarly, the target efficiency for switching and the other efficiency are requests with respect to control amounts that belong to the same category, and these cannot be realized simultaneously. Consequently, processing is necessary that performs a mediation process for each control amount category. As used herein, the term "mediation" refers to a computation process for obtaining a single numerical value from a plurality of numerical values, such as, for example, selecting a maximum value, selecting a minimum value, averaging, or superimposing, and a configuration can also be adopted in which the mediation process appropriately combines a plurality of kinds of computation processes like above. The large arithmetic unit 140 includes three arithmetic units 142, 144, and 146 in order to execute such kind of mediation for each control amount category.

The arithmetic unit 142 is configured to perform a mediation process with respect to the first torque. The requested first torque and the other first torque are input to the arithmetic unit 142. The arithmetic unit 142 performs a mediation process on these values, and outputs a torque that is obtained as the mediation result as a target first torque that is finally determined. In the drawing, the target first torque that is finally determined is described as "TQ1$t$". Minimum value selection is used as the mediation method in the arithmetic unit 142. Accordingly, in a case where a valid value is not output from the arithmetic unit 124, the requested first torque that is provided from the powertrain manager 200 is calculated as the target first torque.

The arithmetic unit 144 is configured to perform a mediation process with respect to the ignition timing efficiency. The target efficiency for switching and the other efficiency are input to the arithmetic unit 144. The arithmetic unit 144 performs a mediation process on these values, and outputs an efficiency that is obtained as the mediation result as a target efficiency that is finally determined. In the drawing, the target efficiency that is finally determined is described as "η$t$". Minimum value selection is used as the mediation method in the arithmetic unit 144. From the viewpoint of fuel consumption performance, it is preferable that the ignition timing efficiency is 1 that is the maximum value thereof. Therefore, as long as no special event occurs, the target efficiency for switching that is calculated by the arithmetic unit 122 and the other efficiency that is calculated by the arithmetic unit 128 are each maintained at a value of 1 that is the maximum value. Accordingly, the value of the target efficiency that is output from the arithmetic unit 144 is fundamentally 1, and a value that is less than 1 is only selected in a case where an event of some kind has occurred.

The arithmetic unit 146 is configured to perform a mediation process with respect to the second torque. The requested second torque, the other second torque, and the target second torque for switching are input to the arithmetic unit 146. The arithmetic unit 146 performs a mediation process on these values, and outputs a torque that is obtained as the mediation result as a target second torque that is finally determined. In the drawing, the target second torque that is finally determined is described as "TQ2$t$". Minimum value selection is used as the mediation method in the arithmetic unit 146. The second torque, including the target second torque for switching, is fundamentally an invalid value, and is switched to a valid value showing the magnitude of the torque it is desired to realize only in a case where a specific event has occurred. Accordingly, the target second torque that is output from the arithmetic unit 146 is also fundamentally an invalid value, and a valid value is selected in only a case where an event of some kind has occurred.

The target first torque, the target efficiency, the virtual air-fuel ratio, the target air-fuel ratio, and the target second torque are output from the large arithmetic unit 140 that is configured as described above. These control parameters are input to the large arithmetic unit 160.

The large arithmetic unit 160 corresponds to an inverse model of the engine, and is constituted by a plurality of models that are represented by a map or a function. Operation amounts of the respective actuators 2, 4, 6, and 8 for coordinated operations are calculated by the large arithmetic unit 160. Among the control parameters that are input from the large arithmetic unit 140, the target first torque and the target second torque are each handled as target values of the torque with respect to the engine. However, the target second torque takes priority over the target first torque. In the large arithmetic unit 160, calculation of operation amounts of the respective actuators 2, 4, 6, and 8 is performed so as to achieve the target second torque in a case where the target second torque is a valid value, or so as to achieve the target first torque in a case where the target second torque is an invalid value. Calculation of the operation amounts is performed so as to also achieve the target air-fuel ratio and the target efficiency simultaneously with the target torque. That is, according to the control device of the present embodiment, the torque, the efficiency and the air-fuel ratio are used as engine control amounts, and air amount control, ignition timing control and fuel injection amount control are conducted based on the target values of these three kinds of control amounts.

The large arithmetic unit 160 includes a plurality of arithmetic units 162, 164, 166, 168, 170, 172, 174, 176, and 178. Among these arithmetic units, the arithmetic units 162, 164, 166, and 178 relate to air amount control, the arithmetic units 168, 170, and 172 relate to ignition timing control, and the arithmetic units 174 and 176 relate to fuel injection amount control. Hereunder, the functions of the respective arithmetic units are described in detail in order, starting from the arithmetic units relating to air amount control.

The target first torque, the target efficiency and the virtual air-fuel ratio are input to the arithmetic unit 162. The arithmetic unit 162 corresponds to target air amount calculation means of the present invention, and uses the target efficiency and the virtual air-fuel ratio to back-calculate from the target first torque a target air amount for achieving the target first torque. In this calculation, the target efficiency and the virtual air-fuel ratio are used as parameters that provide a conversion efficiency of the air amount to torque. Note that, in the present invention, the term "air amount" refers to the amount of air that is drawn into the cylinders, and a charging efficiency or a load factor, which are non-dimensional equivalents of the air amount, is within an equal range to the air amount in the present invention.

The arithmetic unit 162 first calculates a target torque for air amount control by dividing the target first torque by the target efficiency. If the target efficiency is less than 1, the target torque for air amount control becomes larger than the target first torque. This means that a requirement with respect to the air amount control by the actuators 2 and 8 is to be potentially capable of outputting torque that is greater than the target first torque. On the other hand, if the target efficiency is 1, the target first torque is calculated as it is as the target torque for air amount control.

Next, the arithmetic unit 162 converts the target torque for air amount control to a target air amount using a torque-air amount conversion map. The torque-air amount conversion map is prepared on the premise that the ignition timing is the optimal ignition timing, and is a map in which the torque and the air amount are associated using various engine status amounts, such as the engine speed and the air-fuel ratio, as keys. This map is created based on data obtained by testing the engine. Actual values or target values of the engine status amounts are used to search the torque-air amount conversion map. With regard to the air-fuel ratio, the virtual air-fuel ratio is used to search the map. Accordingly, at the arithmetic unit 162, the air amount that is required to realize the target torque for air amount control under the virtual air-fuel ratio is calculated as the target air amount. In the drawing, the target air amount is described as "KLt".

The arithmetic unit 164 back-calculates from the target air amount a target intake pipe pressure that is a target value of the intake pipe pressure. A map that describes the relation between an air amount that is drawn into the cylinders through the intake valve and the intake pipe pressure is used to calculate the target intake pipe pressure. The relation between the air amount and the intake pipe pressure changes depending on the valve timing. Therefore, when calculating the target intake pipe pressure, a parameter value of the aforementioned map is determined based on the current valve timing. The target intake pipe pressure is described as "Pmt" in the drawing.

The arithmetic unit 166 calculates a target throttle opening degree that is a target value of the throttle opening degree based on the target intake pipe pressure. An inverse model of the air model is used to calculate the target throttle opening degree. The air model is a physical model which is obtained as the result of modeling the response characteristic of the intake pipe pressure with respect to operation of the throttle 2. Therefore, the target throttle opening degree that is required to achieve the target intake pipe pressure can be back-calculated from the target intake pipe pressure using the inverse model thereof. The target throttle opening degree is described as "TA" in the drawing. The target throttle opening degree calculated by the arithmetic unit 166 is converted to a signal for driving the throttle 2, and is sent to the throttle 2 through an interface 111 of the ECU. The arithmetic units 164 and 166 correspond to first actuator control means according to the present invention.

The arithmetic unit 178 calculates a target valve timing that is a target value of the valve timing based on the target air amount. A map in which the air amount and the valve timing are associated using the engine speed as an argument is utilized to calculate the target valve timing. The target valve timing is the optimal displacement angle of the VVT 8 for achieving the target air amount based on the current engine speed, and the specific value thereof is determined by adaptation for each air amount and each engine speed. However, in acceleration at which the target air amount increases by a large amount at a fast speed, correction of the target valve timing to the advanced side relative to a valve timing that is determined based on the map is performed so as to increase the actual air amount at the maximum speed to cause the actual air amount to track the target air amount. The target valve timing is described as "VT" in the drawing. The target valve timing calculated by the arithmetic unit 178 is converted to a signal for driving the VVT 8, and is sent to the VVT 8 through an interface 112 of the ECU. The arithmetic unit 178 also corresponds to first actuator control means in the present invention.

Next, the functions of the arithmetic units relating to ignition timing control will be described. The arithmetic unit 168 calculates an estimated torque based on the actual throttle opening degree and valve timing realized by the above described air amount control. The term "estimated torque" as used in the present description refers to torque that can be output in a case where the ignition timing is set to the optimal ignition timing under the current throttle opening degree and valve timing and the target air-fuel ratio. The arithmetic unit 168 first calculates an estimated air amount based on a measured value of the throttle opening degree and a measured value of the valve timing using a forward model of the aforementioned air model. The estimated air amount is an estimated value of an air amount that is actually realized by the current throttle opening degree and valve timing. Next, the arithmetic unit 168 converts the estimated air amount to an estimated torque using the torque-air amount conversion map. The target air-fuel ratio is used as a search key when searching the torque-air amount conversion map. The estimated torque is described as "TQe" in the drawing.

The target second torque and the estimated torque are input to the arithmetic unit 170. The arithmetic unit 170 calculates an instruction ignition timing efficiency that is an instruction value of the ignition timing efficiency based on the target second torque and the estimated torque. The instruction ignition timing efficiency is expressed as a proportion of the target second torque with respect to the estimated torque. However, an upper limit is defined for the instruction ignition timing efficiency, and the value of the instruction ignition timing efficiency is set as 1 in a case where the proportion of the target second torque with respect to the estimated torque exceeds 1. The instruction ignition timing efficiency is described as "ηi" in the drawing.

The arithmetic unit 172 calculates the ignition timing based on the instruction ignition timing efficiency. More specifically, the arithmetic unit 172 calculates the optimal ignition timing based on engine status amounts such as the engine speed, the requested torque and the air-fuel ratio, and calculates a retardation amount with respect to the optimal ignition timing based on the instruction ignition timing efficiency. When the instruction ignition timing efficiency is 1, the retardation amount is set as zero, and the retardation amount is progressively increased as the instruction ignition timing efficiency decreases from 1. The arithmetic unit 172 then calculates the result obtained by adding the retardation amount to the optimal ignition timing as a final ignition timing. A map in which the optimal ignition timing and various engine status amounts are associated can be used to calculate the optimal ignition timing. A map in which the retardation amount, the ignition timing efficiency and various engine status amounts are associated can be used to calculate the retardation amount. The target air-fuel ratio is used as a search key to search these maps. The ignition timing is described as "SA" in the drawing. The ignition timing that is calculated by the arithmetic unit 172 is converted to a signal for driving the ignition device 6, and is sent to the ignition device 6 through an interface 113 of the ECU. The arithmetic units 168, 170 and 172 correspond to third actuator control means in the present invention.

Next, functions of the arithmetic units relating to fuel injection amount control will be described. The arithmetic unit 174 calculates an estimated air amount based on a measured value of the throttle opening degree and a measured value of the valve timing using the forward model of the air model described above. The estimated air amount that is calculated by the arithmetic unit 174 is preferably an air amount that is predicted to arise at a timing at which the intake valve closes. An air amount that will arise in the future can be predicted, for example, based on the target throttle opening degree by providing a delay time period from calculation of the target throttle opening degree until the output thereof. The estimated air amount is described as "KLe" in the drawing.

The arithmetic unit 176 calculates a fuel injection amount, that is, a fuel supply amount, which is required to achieve the target air-fuel ratio based on the target air-fuel ratio and the estimated air amount. Calculation of the fuel injection amount is executed when the timing for calculating a fuel injection amount arrives with respect to each cylinder. The fuel injection amount is described as "TAU" in the drawing. The fuel injection amount that is calculated by the arithmetic unit 176 is converted to a signal for driving the injector 4, and is sent to the injector 4 through an interface 114 of the ECU. The arithmetic units 174 and 176 correspond to second actuator control means in the present invention.

The foregoing is an overview of the logic of the ECU according to the present embodiment. Next, the arithmetic unit 122 that is a main portion of the ECU according to the present embodiment will be described in detail.

Figure 2:
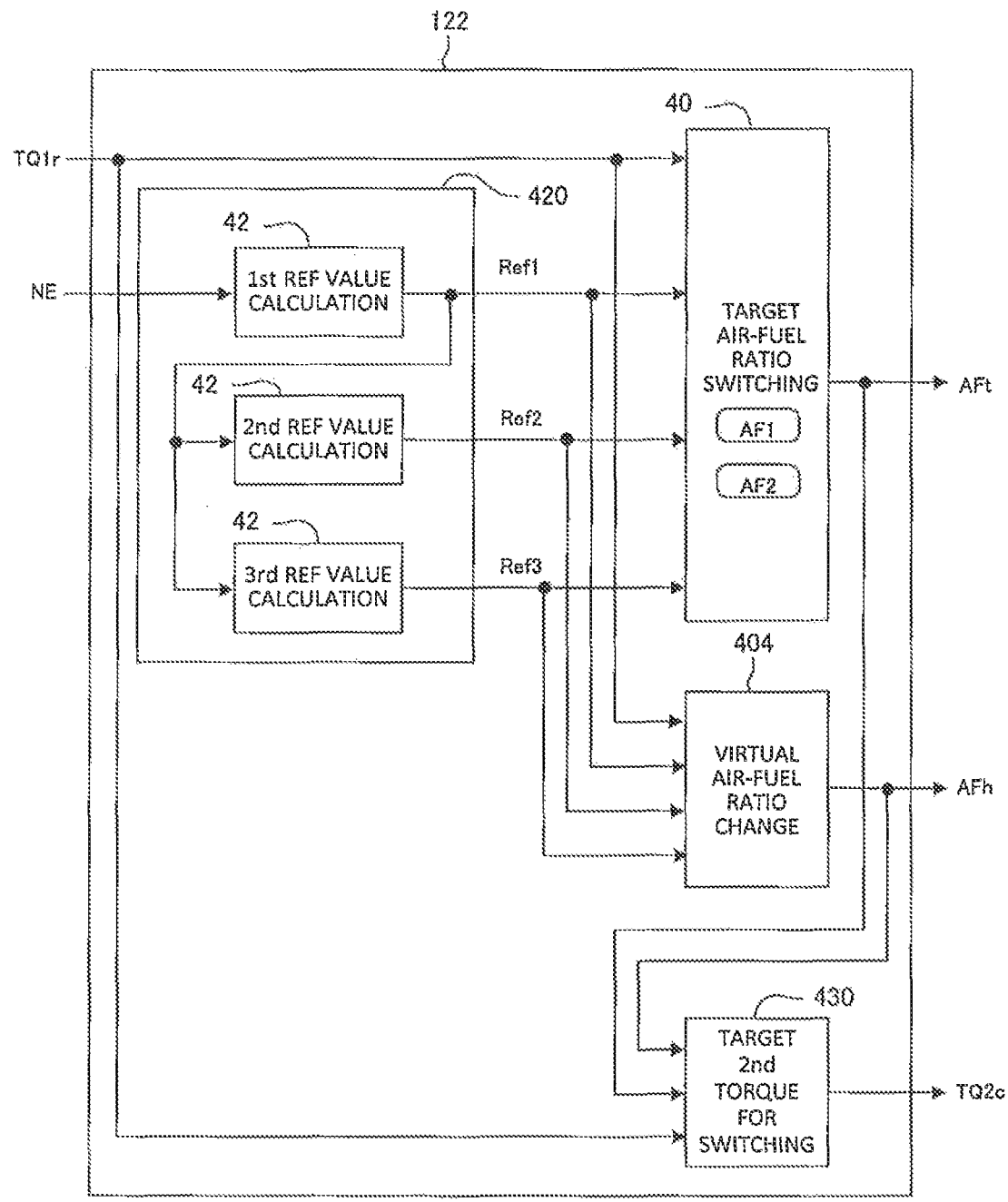
FIG. 2 is a block diagram illustrating the logic for switching an operation mode of the control device according to Embodiment 1 of the present invention.

The logic of the arithmetic unit 122 is illustrated by means of a block diagram in FIG. 2. Inside the block illustrating the arithmetic unit 122 in FIG. 2, among the various functions that the arithmetic unit 122 is equipped with, functions relating to switching of the operation mode are represented by blocks. An arithmetic unit is allocated to these blocks, respectively. A program corresponding to each block is prepared in the ECU, and the functions of the respective arithmetic units are realized in the ECU by executing the programs using a processor. Note that, in a case where the ECU is equipped with a multi-core processor, arithmetic units 402, 404, 420, 430 constituting the arithmetic unit 122 can be dispersed and allocated to a plurality of cores.

First, the arithmetic unit 402 will be described. The first air-fuel ratio that is used in the stoichiometric mode and the second air-fuel ratio that is used in the lean mode are previously set in the arithmetic unit 402. The first air-fuel ratio is the theoretical air-fuel ratio (for example, 14.5). The first air-fuel ratio is described as "AF1" in the drawing. The second air-fuel ratio is a leaner air-fuel ratio than the first air-fuel ratio, and is set to a certain fixed value (for example, 22.0). The second air-fuel ratio is described as "AF2" in the drawing.

The requested first torque is input to the arithmetic unit 402. In addition, a plurality of reference values for the torque is set with respect to the arithmetic unit 402. The reference values include a first reference value, a second reference value that is greater than the first reference value, and a third reference value that is less than the first reference value. In the drawing, the first reference value is described as "Ref1", the second reference value is described as "Ref2", and the third reference value is described as "Ref3".

The arithmetic unit 402 executes switching of the target air-fuel ratio based on the relation between the requested first torque that is input and the reference values. The arithmetic unit 402 corresponds to target air-fuel ratio switching means in the present invention.

First, switching of the target air-fuel ratio in a situation in which the requested first torque is decreasing in accordance with a deceleration request of the driver will be described. During a period in which the requested first torque is greater than the first reference value, the arithmetic unit 402 sets the target air-fuel ratio to the first air-fuel ratio in response to the requested first torque being greater than the first reference value. If the requested first torque becomes less than the first reference value, the arithmetic unit 402 switches the target air-fuel ratio from the first air-fuel ratio to the second air-fuel ratio in response to the requested first torque decreasing to a value that is less than or equal to the first reference value. That is, in deceleration when the requested first torque is decreasing, the requested first torque becoming less than the first reference value acts as a trigger for performing switching of the target air-fuel ratio from the first air-fuel ratio to the second air-fuel ratio. The operation mode is thus switched from the stoichiometric mode to the lean mode by such switching of the target air-fuel ratio.

Switching of the target air-fuel ratio in a situation in which the requested first torque is increasing in accordance with an acceleration request of the driver will now be described. During a period in which the requested first torque is less than the third reference value, the arithmetic unit 402 sets the target air-fuel ratio to the second air-fuel ratio in response to the requested first torque being less than the third reference value. Upon the requested first torque becoming greater than the third reference value in due course, in response to the requested first torque increasing to a value that is greater than the third reference value, the arithmetic unit 402 switches the target air-fuel ratio from the second air-fuel ratio to the first air-fuel ratio. That is, in acceleration when the requested first torque is increasing, the requested first torque becoming greater than the third reference value acts as a trigger for performing switching of the target air-fuel ratio from the second air-fuel ratio to the first air-fuel ratio. By switching the target air-fuel ratio, the operation mode is switched from the lean mode to the stoichiometric mode.

Note that, in the present embodiment, the second reference value is not used for switching of the target air-fuel ratio by the arithmetic unit 402. However, since the second reference value is also input to the arithmetic unit 402, it is possible to alter the logic for switching the target air-fuel ratio so as to use the second reference value together with or in place of the first reference value or third reference value.

Next, the arithmetic unit 420 will be described. The arithmetic unit 420 is constituted by three arithmetic units 422, 424 and 426. The aforementioned reference values are calculated by the arithmetic units 422, 424 and 426, respectively. The arithmetic unit 420 corresponds to reference value calculation means in the present invention.

The arithmetic unit 422 calculates the first reference value. The first reference value is a torque that serves as a boundary between the lean mode and the stoichiometric mode in deceleration, and the optimal value is adapted for each engine speed from the viewpoint of fuel consumption performance, exhaust gas performance and drivability. The arithmetic unit 422 refers to a previously prepared map to calculate a first reference value that is suitable for the engine speed.

The arithmetic unit 424 calculates the second reference value. The second reference value is a value of torque that is obtained if the air-fuel ratio is adjusted to the first air-fuel ratio at an air amount with which the torque of the first reference value can be achieved under the second air-fuel ratio. First, the arithmetic unit 424 calculates the air amount with which the torque of the first reference value can be achieved under the second air-fuel ratio. This calculation is performed using the torque-air amount conversion map. Next, the arithmetic unit 424 calculates a torque that can be achieved by the air amount obtained by the previous calculation under the first air-fuel ratio, and determines the torque value that is obtained as a result of the present calculation to be the second reference value. This calculation is also performed using the torque-air amount conversion map.

The arithmetic unit 426 calculates the third reference value. The third reference value is a value of torque that is obtained if the air-fuel ratio is adjusted to the second air-fuel ratio at an air amount with which the torque of the first reference value can be achieved under the first air-fuel ratio. First, the arithmetic unit 426 calculates the air amount with which the torque of the first reference value can be achieved under the first air-fuel ratio. This calculation is performed using the torque-air amount conversion map. Next, the arithmetic unit 426 calculates a torque that can be achieved by the air amount obtained by the previous calculation under the second air-fuel ratio, and determines the torque value that is obtained as a result of the present calculation to be the third reference value. This calculation is also performed using the torque-air amount conversion map.

Next, the arithmetic unit 404 will be described. The requested first torque is input to the arithmetic unit 404. In addition, the first reference value, the second reference value and the third reference value that were calculated by the arithmetic unit 420 are set with respect to the arithmetic unit 404. Further, the respective values of the first air-fuel ratio and the second air-fuel ratio that are the same as those set in the arithmetic unit 402 are also set in the arithmetic unit 404.

The arithmetic unit 404 changes the value of the virtual air-fuel ratio that is used to calculate the target air amount, based on the relation between the requested first torque that is input and the reference values. The arithmetic unit 404 corresponds to parameter value changing means in the present invention.

First, changing of the virtual air-fuel ratio in a situation in which the requested first torque is decreasing in accordance with a deceleration request of the driver will be described. During a period in which the requested first torque is greater than the second reference value, the arithmetic unit 404 sets the virtual air-fuel ratio to the first air-fuel ratio in response to the requested first torque being greater than the second reference value. When the requested first torque becomes less than the second reference value in due course, the arithmetic unit 404 starts to change the virtual air-fuel ratio to the lean side from the first air-fuel ratio in response to the requested first torque decreasing to a value that is less than or equal to the second reference value. Further, the arithmetic unit 404 gradually changes the virtual air-fuel ratio from the first air-fuel ratio to the second air-fuel ratio in accordance with a decrease in the requested first torque from the second reference value to the first reference value. That is, in deceleration when the requested first torque is decreasing, prior to the target air-fuel ratio being switched from the first air-fuel ratio to the second air-fuel ratio, the virtual air-fuel ratio is gradually changed from the first air-fuel ratio to the second air-fuel ratio during a period in which the requested first torque decreases from the second reference value to the first reference value. A method for gradually changing the virtual air-fuel ratio is not limited. For example, the virtual air-fuel ratio can be gradually changed from the first air-fuel ratio to the second air-fuel ratio by using a first-order lag filter process or a weighted average process. Naturally, the virtual air-fuel ratio may also be changed from the first air-fuel ratio to the second air-fuel ratio at a constant rate of change.

Changing of the virtual air-fuel ratio in a situation in which the requested first torque is increasing in accordance with an acceleration request of the driver will now be described. During a period in which the requested first torque is less than the third reference value, the arithmetic unit 404 sets the virtual air-fuel ratio to the second air-fuel ratio in response to the requested first torque being less than the third reference value. Upon the requested first torque becoming greater than the third reference value in due course, the arithmetic unit 404 starts to change the virtual air-fuel ratio to the rich side from the second air-fuel ratio in response to the requested first torque increasing to a value that is greater than or equal to the third reference value. Further, the arithmetic unit 404 gradually changes the virtual air-fuel ratio from the second air-fuel ratio to the first air-fuel ratio as the requested first torque further increases from the third reference value towards the first reference value. That is, in acceleration when the requested first torque is increasing, after the target air-fuel ratio is switched from the second air-fuel ratio to the first air-fuel ratio, the virtual air-fuel ratio is gradually changed from the second air-fuel ratio to the first air-fuel ratio in accordance with a further increase in the requested first torque.

Finally the arithmetic unit 430 will be described. The arithmetic unit 430 calculates the target second torque for switching. As described above, the target second torque for switching is input to the arithmetic unit 146 together with the requested second torque and the other second torque, and the smallest value among those values is selected by the arithmetic unit 146. The requested second torque and the other second torque are normally invalid values, and are switched to valid values only in a case where a special event has occurred. The same applies with respect to the target second torque for switching also, and the arithmetic unit 430 normally sets the output value of the target second torque for switching to an invalid value.

The requested first torque, the target air-fuel ratio, and the virtual air-fuel ratio are input to the arithmetic unit 430. According to the logic of the arithmetic units 402 and 404, the target air-fuel ratio and the virtual air-fuel ratio match before processing to switch the operation mode begins, and also match after the switching processing is completed. However, during the processing to switch the operation mode, the target air-fuel ratio and the virtual air-fuel ratio diverge from each other. The arithmetic unit 430 calculates the target second torque for switching that has a valid value, only during a period in which the target air-fuel ratio and the virtual air-fuel ratio diverge from each other. In this case, the requested first torque is used as the valid value of the target second torque for switching. That is, during a period in which the target air-fuel ratio and the virtual air-fuel ratio diverge from each other, the requested first torque is output from the arithmetic unit 430 as the target second torque for switching.

The foregoing is a detailed description of the logic of the arithmetic unit 122, that is, the logic for switching the operation mode that is adopted in the present embodiment. Next, control results in a case where engine control is executed in accordance with the above described logic will be described based on a time charts that illustrate an image thereof.

First, as a comparative example with respect to the logic adopted in the present embodiment, results of control according to the aforementioned first solution for the object of the present invention will be described. Since the present invention is technology that eliminates a concern associated with the first solution, it is considered that the advantages of the logic adopted in the present embodiment will become clearer by first clarifying the results of control according to the first solution as well as a concern that exists with regard thereto.

Figure 3:
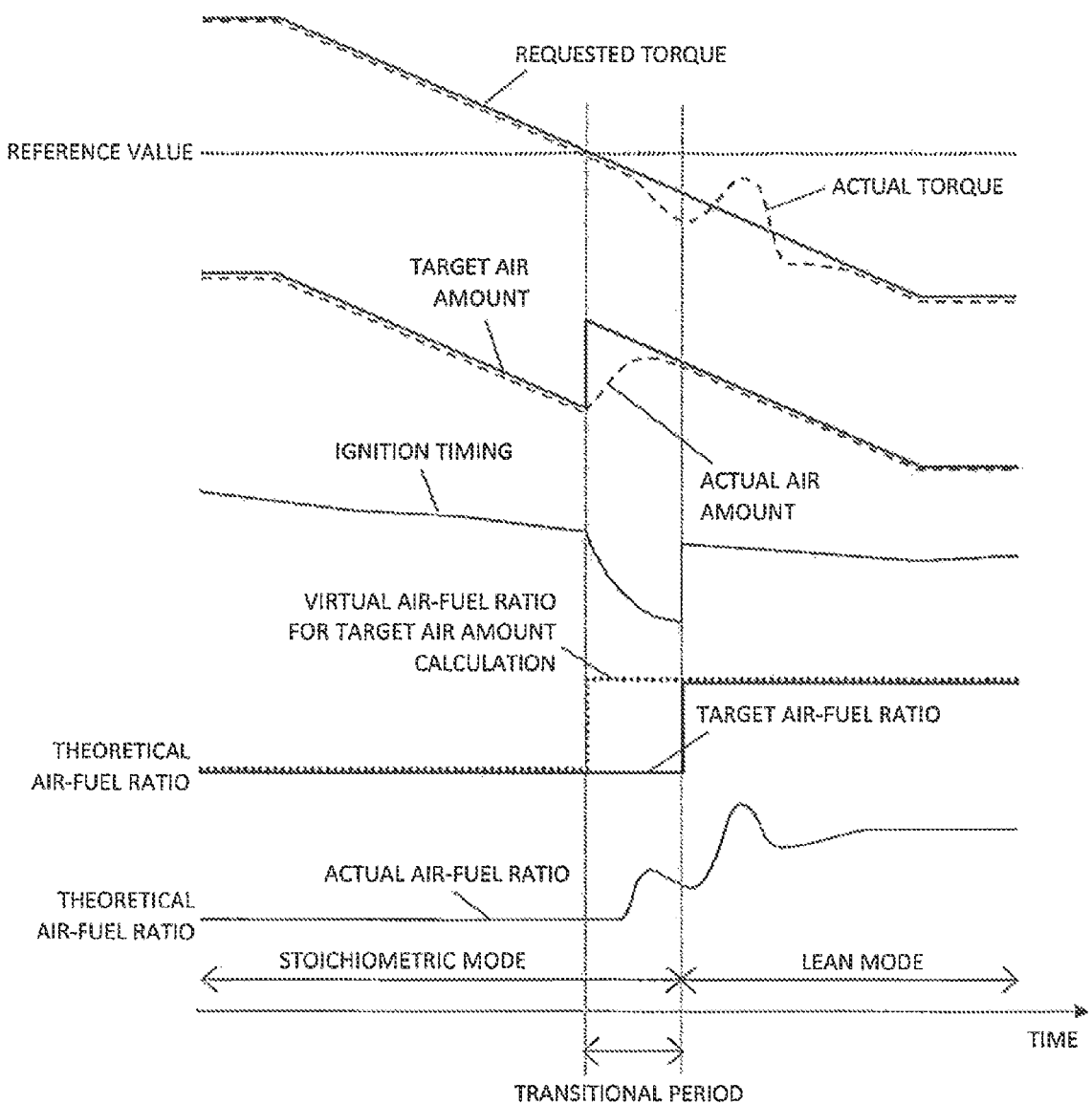
FIG. 3 is a time chart that illustrates an image of results of control in deceleration according to a first solution.
Figure 4:
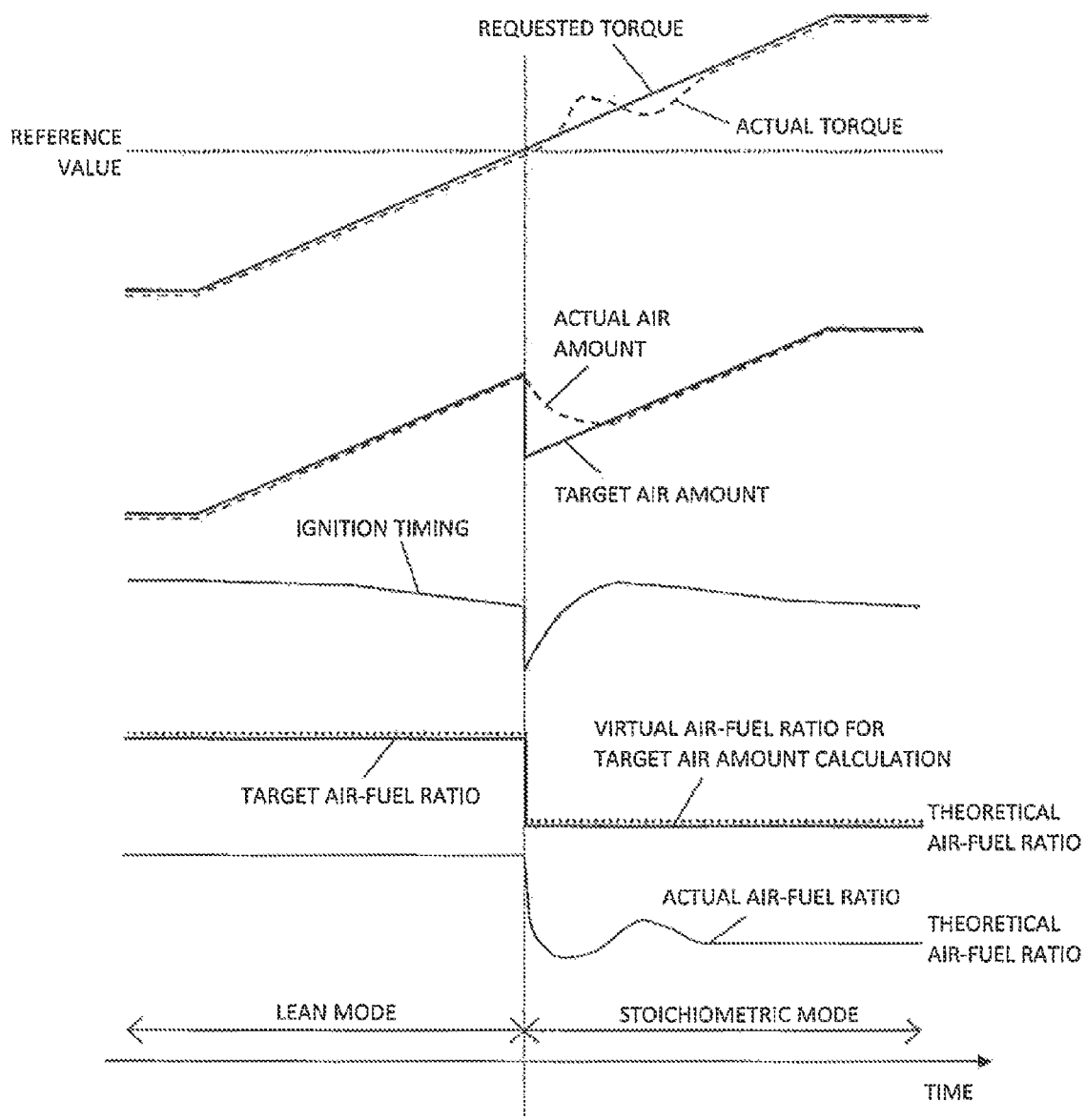
FIG. 4 is a time chart that illustrates an image of results of control in acceleration according to the first solution.

FIG. 3 is a time chart that illustrates an image of results of control in deceleration according to the first solution. FIG. 4 is a time chart that illustrates an image of results of control in acceleration according to the first solution. In each of FIG. 3 and FIG. 4, a chart on the first (upper) level illustrates changes over time in the requested torque and actual torque. A chart on the second level from the top illustrates changes over time in the target air amount and the actual air amount. A chart on the third level from the top illustrates changes over time in the ignition timing. A chart on the fourth level from the top illustrates changes over time in the target air-fuel ratio and the virtual air-fuel ratio that is a parameter for calculating the target air amount. The virtual air-fuel ratio is a parameter that provides the conversion efficiency of the air amount to torque, and an air amount that is required to achieve the requested torque under the virtual air-fuel ratio is the target air amount. According to the first solution, both the target air-fuel ratio and the virtual air-fuel ratio are switched in a step manner between the first air-fuel ratio (theoretical air-fuel ratio) and the second air-fuel ratio (lean air-fuel ratio). Further, a chart on the fifth level from the top illustrates changes over time in the actual air-fuel ratio.

The control results illustrated in FIG. 3 will be discussed. According to the first solution, in deceleration, the virtual air-fuel ratio is switched from the first air-fuel ratio to the second air-fuel ratio prior to switching of the target air-fuel ratio from the first air-fuel ratio to the second air-fuel ratio. As a result of this switching, the target air amount increases in a step manner up to an air amount that is in accordance with the second air-fuel ratio, and the actual air amount increases by a large amount to track the target air amount. By increasing the target air amount prior to switching of the target air-fuel ratio in this way, it is possible to increase the air amount to an amount that is in accordance with the second air-fuel ratio by the time that the target air-fuel ratio is switched. Further, since the ignition timing is retarded relative to the optimal ignition timing by an amount corresponding to the amount by which the target air amount was increased prior to switching of the target air-fuel ratio, an increase in torque that is caused by an excess in the air amount can be cancelled out by a decrease in torque that is caused by retardation of the ignition timing.

The control results illustrated in FIG. 4 will now be discussed. According to the first solution, in acceleration, the virtual air-fuel ratio is switched from the first air-fuel ratio to the second air-fuel ratio at the same timing as that at which the target air-fuel ratio is switched from the first air-fuel ratio to the second air-fuel ratio. As a result of this switching, the target air amount decreases in a step manner to an air amount in accordance with the first air-fuel ratio, and the actual air amount also decreases by a large amount to track the target air amount. At this time, although the actual air amount exceeds the target air amount during an interim period due to a response delay in the air amount with respect to operation of an actuator, by retarding the ignition timing relative to the optimal ignition timing, an increase in torque that is caused by the excess in the air amount is cancelled out by a decrease in torque caused by retardation of the ignition timing.

In this connection, according to the first solution, in both deceleration and acceleration, fluctuations arise in the actual air-fuel ratio after switching the target air-fuel ratio, and there is a concern that such fluctuations will lead to fluctuations in the torque. Images of the changes in the actual air-fuel ratio and the actual torque that are of concern are shown in FIG. 3 and FIG. 4. In deceleration, when the target air amount increases in a step manner, as a result of the actual air amount increasing at a fast rate to track the target air amount, the flow rate of air that is drawn into the cylinders from an intake port changes significantly. In acceleration, when the target air amount decreases in a step manner, as a result of the actual air amount decreasing at a fast rate to track the target air amount, the flow rate of air that is drawn into the cylinders from an intake port changes significantly. A significant change in the intake air flow rate causes the evaporation amount of fuel adhering to the intake port to fluctuate, and the influence of such fluctuations cause fluctuations to arise in the actual air-fuel ratio after switching the target air-fuel ratio. Fluctuations in the actual air-fuel ratio lead to fluctuations in the actual torque, and therefore a smooth decrease in torque that is consistent with a deceleration request of the driver is impaired.

The above described concern regarding the first solution is eliminated in the following manner by the logic adopted in the present embodiment.

Figure 5:
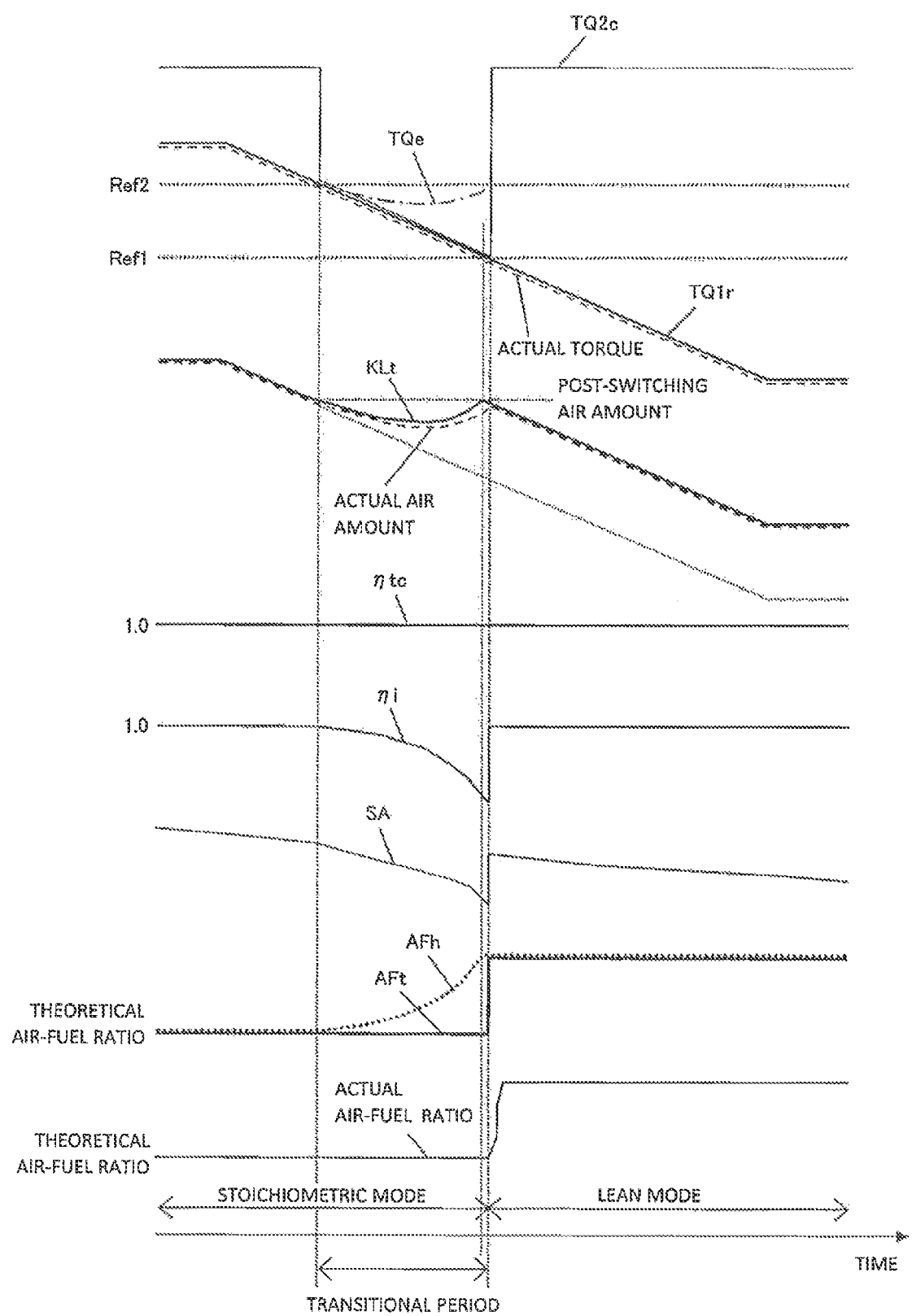
FIG. 5 is a time chart that illustrates an image of results of control in deceleration that is performed by the control device according to Embodiment 1 of the present invention.
Figure 6:
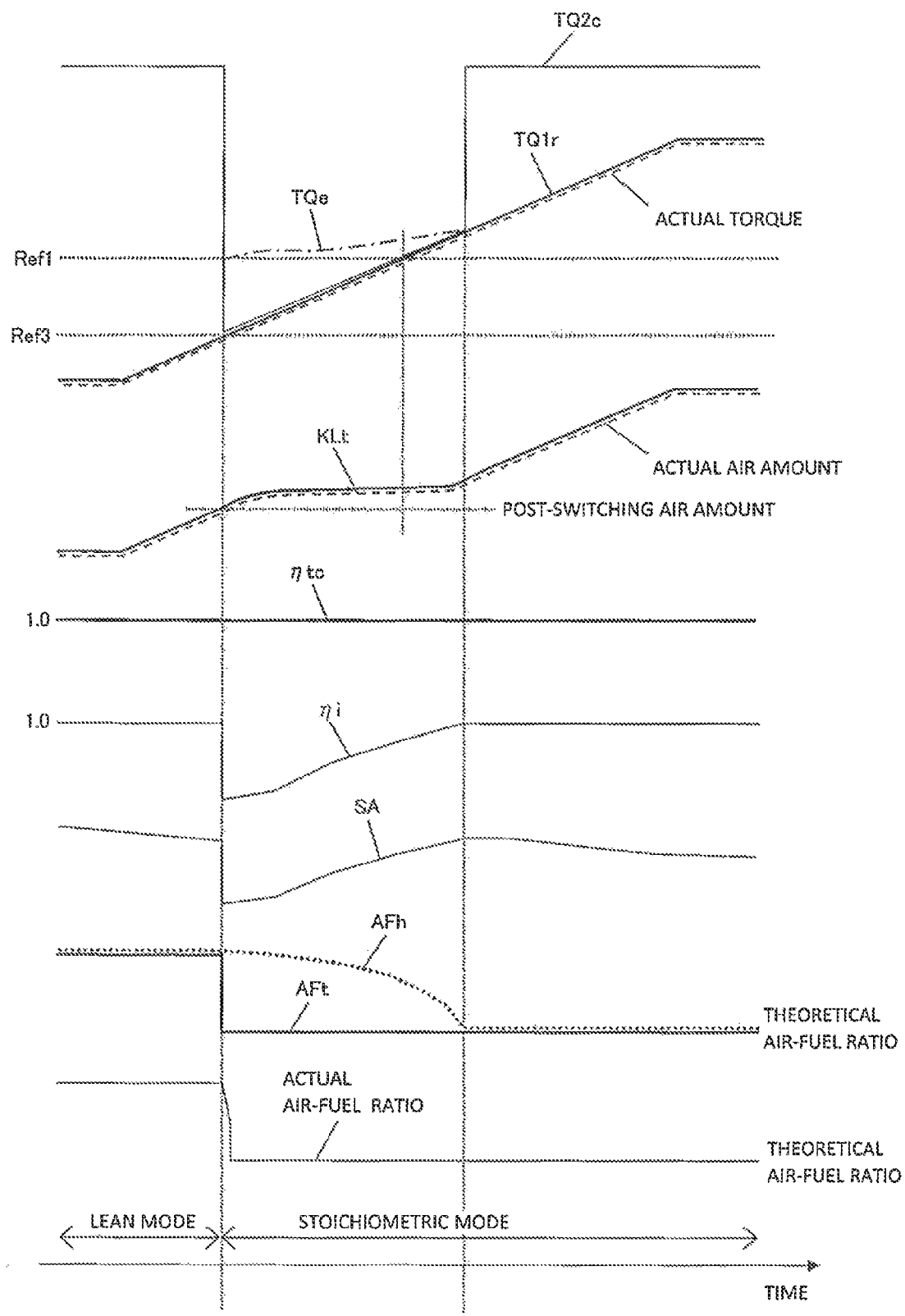
FIG. 6 is a time chart that illustrates an image of results of control in acceleration that is performed by the control device according to Embodiment 1 of the present invention.

FIG. 5 is a time chart that illustrates an image of results of control in deceleration that is performed by the ECU according to the present embodiment. FIG. 6 is a time chart that illustrates an image of results of control in acceleration that is performed by the ECU according to the present embodiment. In each of FIG. 5 and FIG. 6, a chart on the first (upper) level illustrates changes over time in the torque. As described above, reference character "TQ1$r$" denotes the requested first torque, reference character "TQ2$c$" denotes the target second torque for switching, and reference character "TQe" denotes the estimated torque. Note that, in this case the requested first torque is the final target first torque, and the target second torque for switching is the final target second torque. Further, in addition to these torques, the actual torque is represented by a dashed line on the chart. However, the actual torque is not measured during the actual engine control. The line for the actual torque that is shown in the chart is an image line that is supported by test results.

A chart on the second level from the top in FIG. 5 and FIG. 6 illustrates changes over time in the air amount. As described above, reference character "KLt" denotes the target air amount. In addition to the target air amount, the actual air amount is represented by a dashed line in the chart. However, the actual air amount is not measured during the actual engine control. The line for the actual air amount that is shown in the chart is an image that is supported by test results.

A chart on the third level from the top in FIG. 5 and FIG. 6 illustrates changes over time in the target efficiency for switching. As described above, reference character "ηtc" denotes the target efficiency for switching. Note that, in this case the target efficiency for switching is the final target efficiency.

A chart on the fourth level from the top in FIG. 5 and FIG. 6 illustrates changes over time in the instruction ignition timing efficiency. As described above, reference character "ηi" denotes the instruction ignition timing efficiency.

A chart on the fifth level from the top in FIG. 5 and FIG. 6 illustrates changes over time in the ignition timing. As described above, reference character "SA" denotes the ignition timing.

A chart on the sixth level from the top in FIG. 5 and FIG. 6 illustrates changes over time in the air-fuel ratio. As described above, reference character "AFt" denotes the target air-fuel ratio, and reference character "AFh" denotes the virtual air-fuel ratio. Further, a chart on the seventh level from the top in FIG. 5 and FIG. 6 illustrates changes over time in the actual air-fuel ratio.

First, results of control in deceleration will be described based on FIG. 5. In deceleration, until the requested first torque decreases to the level of the second reference value that is represented by "Ref2", the target air-fuel ratio is maintained at the first air-fuel ratio that is the theoretical air-fuel ratio, and the virtual air-fuel ratio is also maintained at the first air-fuel ratio. Hence, the target air amount that is calculated based on the requested first torque and the virtual air-fuel ratio decrease in response to a decrease in the requested first torque. During this period, the target second torque for switching is set to an invalid value in response to the target air-fuel ratio and the virtual air-fuel ratio matching. Since the instruction ignition timing efficiency becomes 1 when the target second torque for switching is an invalid value, the ignition timing is maintained at the optimal ignition timing. Note that, although the ignition timing in the chart changes in accordance with a decrease in the requested first torque, this is a change that corresponds to the optimal ignition timing changing depending on the engine speed or the air amount.

When the requested first torque becomes lower than the second reference value, while on one hand the target air-fuel ratio is maintained at the theoretical air-fuel ratio, on the other hand the virtual air-fuel ratio is gradually changed to the lean side. As a result of the virtual air-fuel ratio being made leaner while the requested first torque decreases, a decrease in the target air amount that is calculated based on the requested first torque and the virtual air-fuel ratio is suppressed. In due course the requested first torque decreases to the level of the first reference value that is represented by "Ref1", and at such time the virtual air-fuel ratio reaches the second air-fuel ratio. At that time point, the target air-fuel ratio is also switched from the first air-fuel ratio to the second air-fuel ratio. Note that, although in the drawing there is a lag of a certain amount between the timing at which the virtual air-fuel ratio reaches the second air-fuel ratio and the timing at which the target air-fuel ratio is switched to the second air-fuel ratio, this lag can be eliminated by adjusting the coefficient that provides the rate of change of the virtual air-fuel ratio or the like.

Operation according to the second air-fuel ratio that is a lean air-fuel ratio requires a larger air amount than the air amount required for operation according to the first air-fuel ratio that is the theoretical air-fuel ratio. Therefore, when the air-fuel ratio that is used for calculating the target air amount is switched in a step manner from the first air-fuel ratio to the second air-fuel ratio as proposed in the first solution, the target air amount also increases in a step manner at the time of such switching. However, according to the logic adopted in the present embodiment, if the target air amount decreases as far as the air amount after switching (a "post-switching air amount" that is shown in the drawing) of the target air-fuel ratio, the target air amount is maintained at approximately the post-switching air amount until a condition for switching the target air-fuel ratio is satisfied. Consequently, a stepwise increase in the target air amount is prevented at the time point at which the target air-fuel ratio is switched. If the stepwise increase in the target air amount is eliminated, an abrupt change in the actual air amount that tracks the target air amount is also eliminated. Thus, fluctuations in the actual air-fuel ratio due to fluctuations in the evaporation amount of fuel adhering to the intake port that are a concern in the first solution are prevented.

During a period from a time that the requested first torque becomes lower than the second reference value until the requested first torque becomes lower than the first reference value, the target second torque for switching is set to a valid value in response to the target air-fuel ratio and the virtual air-fuel ratio not matching. That is, the target second torque for switching is set to the same value as the requested first torque. On the other hand, accompanying the virtual air-fuel ratio that is used for calculating the target air amount being made leaner than the target air-fuel ratio, the estimated torque that is calculated based on an estimated value of the actual air amount becomes a larger value than the requested first torque that is calculated based on the target air-fuel ratio. As a result, the instruction ignition timing efficiency that is the proportion of the target second torque for switching relative to the estimated torque becomes a value that is less than 1. Further, in response to the instruction ignition timing efficiency becoming less than 1, the ignition timing is retarded relative to the optimal ignition timing. As a result, an increase in torque that is caused by an excess in the air amount is cancelled out by a decrease in torque caused by retardation of the ignition timing, and a divergence in the actual torque from the requested first torque is prevented.

As described above, according to the logic adopted in the present embodiment, the air-fuel ratio can be switched with favorable responsiveness from the first air-fuel ratio that is the theoretical air-fuel ratio to the second air-fuel ratio that is a leaner air-fuel ratio than the theoretical air-fuel ratio while achieving a smooth decrease in torque that is consistent with a deceleration request of the driver.

Next, results of control in acceleration will be described based on FIG. 6. In acceleration, until the requested first torque increases as far as the level of the third reference value that is represented by "Ref3", the target air-fuel ratio is maintained at the second air-fuel ratio that is a lean air-fuel ratio, and the virtual air-fuel ratio is also maintained at the second air-fuel ratio. Hence, the target air amount that is calculated based on the requested first torque and the virtual air-fuel ratio increases in response to an increase in the requested first torque. During this period, the target second torque for switching is set to an invalid value in response to the target air-fuel ratio and the virtual air-fuel ratio matching. Since the instruction ignition timing efficiency becomes 1 when the target second torque for switching is an invalid value, the ignition timing is maintained at the optimal ignition timing.

When the requested first torque becomes higher than the third reference value, the target air-fuel ratio is switched from the second air-fuel ratio to the first air-fuel ratio that is the theoretical air-fuel ratio, and in response thereto the virtual air-fuel ratio is gradually changed to the rich side. By the virtual air-fuel ratio being made richer while the requested first torque increases, an increase in the target air amount that is calculated based on the requested first torque and the virtual air-fuel ratio is suppressed. In due course the requested first torque reaches the level of the first reference value, and further increases to exceed the first reference value. The virtual air-fuel ratio reaches the second air-fuel ratio around the time that the requested first torque reaches the level of the first reference value.

The air amount required for operation according to the first air-fuel ratio that is the theoretical air-fuel ratio is less in comparison to the air amount required for operation according to the second air-fuel ratio that is a lean air-fuel ratio. Therefore, when the air-fuel ratio that is used for calculating the target air amount is switched in a step manner from the second air-fuel ratio to the first air-fuel ratio as proposed in the first solution, the target air amount also decreases in a step manner at the time point of such switching. However, according to the logic adopted in the present embodiment, while on one hand the target air-fuel ratio switches in a step manner, on the other hand the virtual air-fuel ratio that is used for calculating the target air amount is gradually made richer. Consequently, a stepwise decrease in the target air amount is prevented at the time point at which the target air-fuel ratio is switched. If the stepwise decrease in the target air amount is eliminated, an abrupt change in the actual air amount that tracks the target air amount is also eliminated. Thus, fluctuations in the actual air-fuel ratio due to fluctuations in the evaporation amount of fuel adhering to the intake port that are a concern in the first solution are prevented. Note that, although a timing at which the virtual air-fuel ratio reaches the second air-fuel ratio can be arbitrarily set, preferably the timing is determined by adaptation so that changes in the actual air amount after switching of the target air-fuel ratio become flat.

During a period from a time that the requested first torque becomes greater than the third reference value until the target air-fuel ratio and the virtual air-fuel ratio match, the target second torque for switching is set to the same value as the requested first torque that is a valid value. On the other hand, because the virtual air-fuel ratio becomes leaner than the target air-fuel ratio as a result of the target air-fuel ratio being switched to the first air-fuel ratio, the estimated torque that is calculated based on the virtual air-fuel ratio becomes a larger value than the requested first torque that is calculated based on the target air-fuel ratio. As a result, the instruction ignition timing efficiency that is the proportion of the target second torque for switching relative to the estimated torque becomes a value that is less than 1. Further, in response to the instruction ignition timing efficiency becoming less than 1, the ignition timing is retarded relative to the optimal ignition timing. As a result, an increase in torque that is caused by an excess in the air amount is cancelled out by a decrease in torque caused by retardation of the ignition timing, and a divergence in the actual torque from the requested first torque is prevented.

As described above, according to the logic adopted in the present embodiment, the air-fuel ratio can be switched with favorable responsiveness from the second air-fuel ratio that is a leaner air-fuel ratio than the theoretical air-fuel ratio to the first air-fuel ratio that is the theoretical air-fuel ratio while achieving a smooth increase in torque that is consistent with an acceleration request of the driver.

Embodiment 2

Next, Embodiment 2 of the present invention will be described with reference to the drawing.

Embodiment 2 differs from Embodiment 1 in the logic of the arithmetic unit 122. The overall logic of the ECU is common to that of Embodiment 1, and the logic of the ECU according to the present embodiment can also be represented by FIG. 1.

Figure 7:
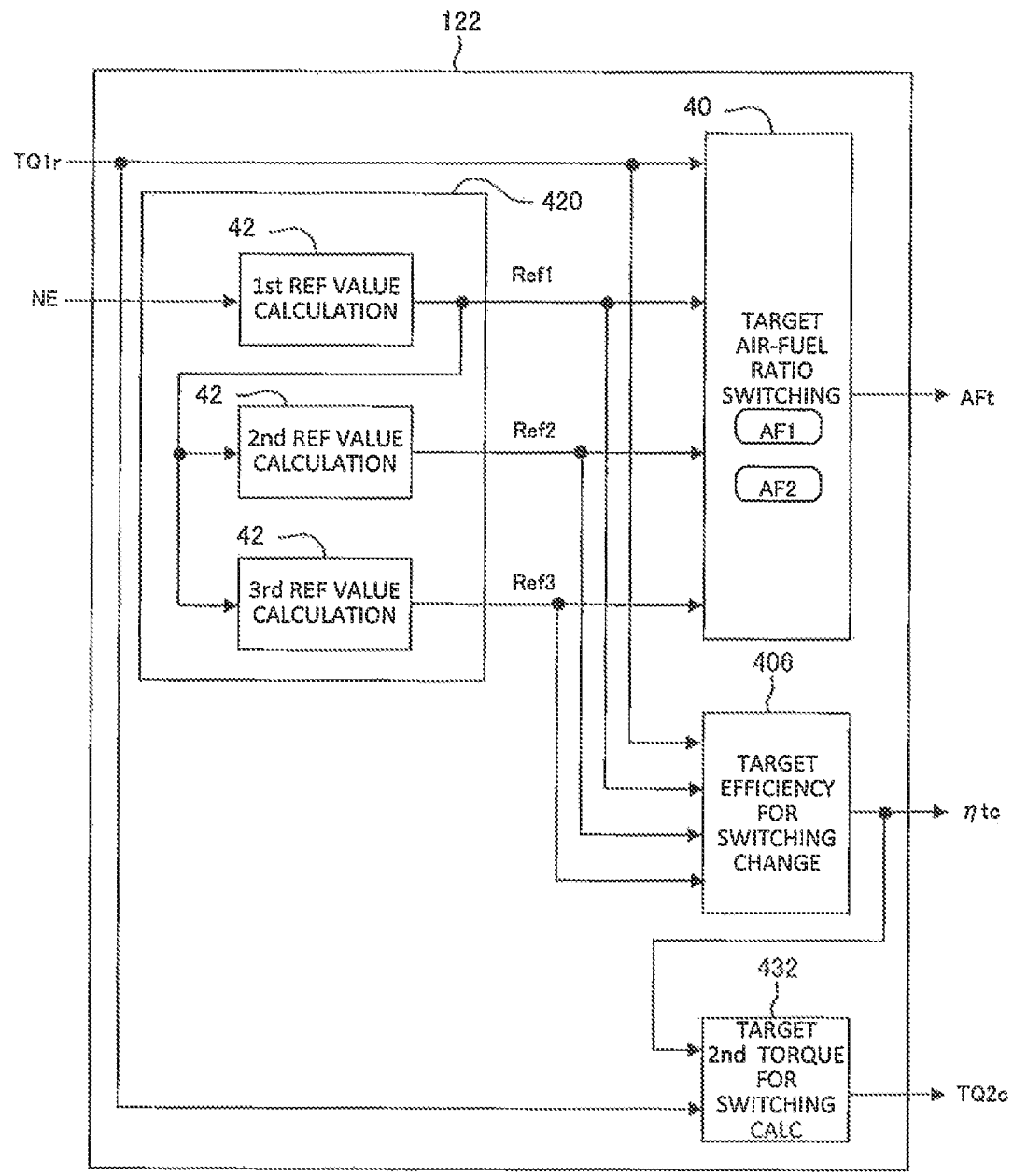
FIG. 7 is a block diagram illustrating the logic for switching an operation mode of the control device according to Embodiment 2 of the present invention.

The logic of the arithmetic unit 122 according to the present embodiment is illustrated by means of a block diagram in FIG. 7. The arithmetic unit 122 according to the present embodiment includes arithmetic units 402, 420, 406 and 432. Among these arithmetic units, the arithmetic units 402 and 420 are common with the arithmetic units according to Embodiment 1, and hence a description thereof is omitted here. Hereunder, the arithmetic units 406 and 432 that constitute a difference relative to Embodiment 1 are described.

The arithmetic unit 406 is provided in place of the arithmetic unit 404 according to Embodiment 1. The requested first torque is input to the arithmetic unit 406. In addition, the first reference value, the second reference value and the third reference value that are calculated by the arithmetic unit 420 are set with respect to the arithmetic unit 406.

The arithmetic unit 406 changes the value of the target efficiency for switching based on the relation between the requested first torque that is input and the reference values. Similarly to the virtual air-fuel ratio, the target efficiency for switching is a parameter that provides a conversion efficiency of the air amount to torque. The arithmetic unit 406 corresponds to parameter value changing means in the present invention.

First, a change in the target efficiency for switching in a situation in which the requested first torque is decreasing in accordance with a deceleration request of the driver will be described. During a period in which the requested first torque is greater than the second reference value, the arithmetic unit 406 sets the target efficiency for switching to 1 in response to the requested first torque being greater than the second reference value. When the requested first torque becomes less than the second reference value in due course, the arithmetic unit 406 starts to decrease the target efficiency for switching from 1 in response to the requested first torque decreasing to a value that is less than or equal to the second reference value. Further, during a period in which the requested first torque decreases from the second reference value to the first reference value, the arithmetic unit 406 calculates a proportion of the requested first torque relative to the second reference value as the target efficiency for switching. That is, a calculation represented by the formula "ηtc=TQ1r÷Ref2" is performed by the arithmetic unit 406. If the target efficiency for switching is less than the other efficiency, the target efficiency for switching becomes the final target efficiency. When calculating the target air amount, a torque obtained by dividing the requested first torque by the target efficiency is converted to a target air amount. Hence, when the target efficiency for switching is represented by the above formula, the torque of the second reference value is converted to a target air amount. Note that, in the present embodiment, the target air-fuel ratio is used as usual for the virtual air-fuel ratio that is used for calculating the target air amount. When the requested first torque becomes lower than the first reference value, the arithmetic unit 406 again sets the target efficiency for switching to 1 in response to the requested first torque being less than the first reference value.

Changing of the target efficiency for switching in a situation in which the requested first torque is increasing in accordance with an acceleration request of the driver will now be described. During a period in which the requested first torque is less than the third reference value, the arithmetic unit 406 sets the target efficiency for switching to 1 in response to the requested first torque being less than the third reference value. When the requested first torque becomes a value that is greater than the third reference value in due course, the arithmetic unit 406 decreases the target efficiency for switching from 1 in a step manner in response to the requested first torque increasing to a value that is equal to or greater than the third reference value. Further, during a period in which the requested first torque increases from the third reference value to the first reference value, the arithmetic unit 406 calculates a proportion of the requested first torque relative to the first reference value as the value of the target efficiency for switching. That is, a calculation represented by the formula "ηtc=TQ1r÷Ref1" is performed by the arithmetic unit 406. Because a torque that is obtained by dividing the requested first torque by the target efficiency is converted to a target air amount, when the target efficiency for switching is represented by the above formula, the torque of the first reference value is converted to the target air amount. If the requested first torque becomes greater than the first reference value, the arithmetic unit 406 again sets the target efficiency for switching to 1 in response to the requested first torque becoming greater than the first reference value.

The arithmetic unit 432 is provided in place of the arithmetic unit 430 according to Embodiment 1. The arithmetic unit 432 calculates the target second torque for switching. The requested first torque and the target efficiency for switching are input to the arithmetic unit 432. As long as the target efficiency for switching is a value less than 1, the arithmetic unit 432 calculates the target second torque for switching that has a valid value. In this case the requested first torque is used as the valid value of the target second torque for switching. That is, during a period in which the target efficiency for switching is less than 1, the requested first torque is output as the target second torque for switching from the arithmetic unit 432.

Next, control results in a case in which engine control is executed in accordance with the logic for switching the operation mode that is adopted in the present embodiment will be described based on time charts illustrating an image thereof.

Figure 8:
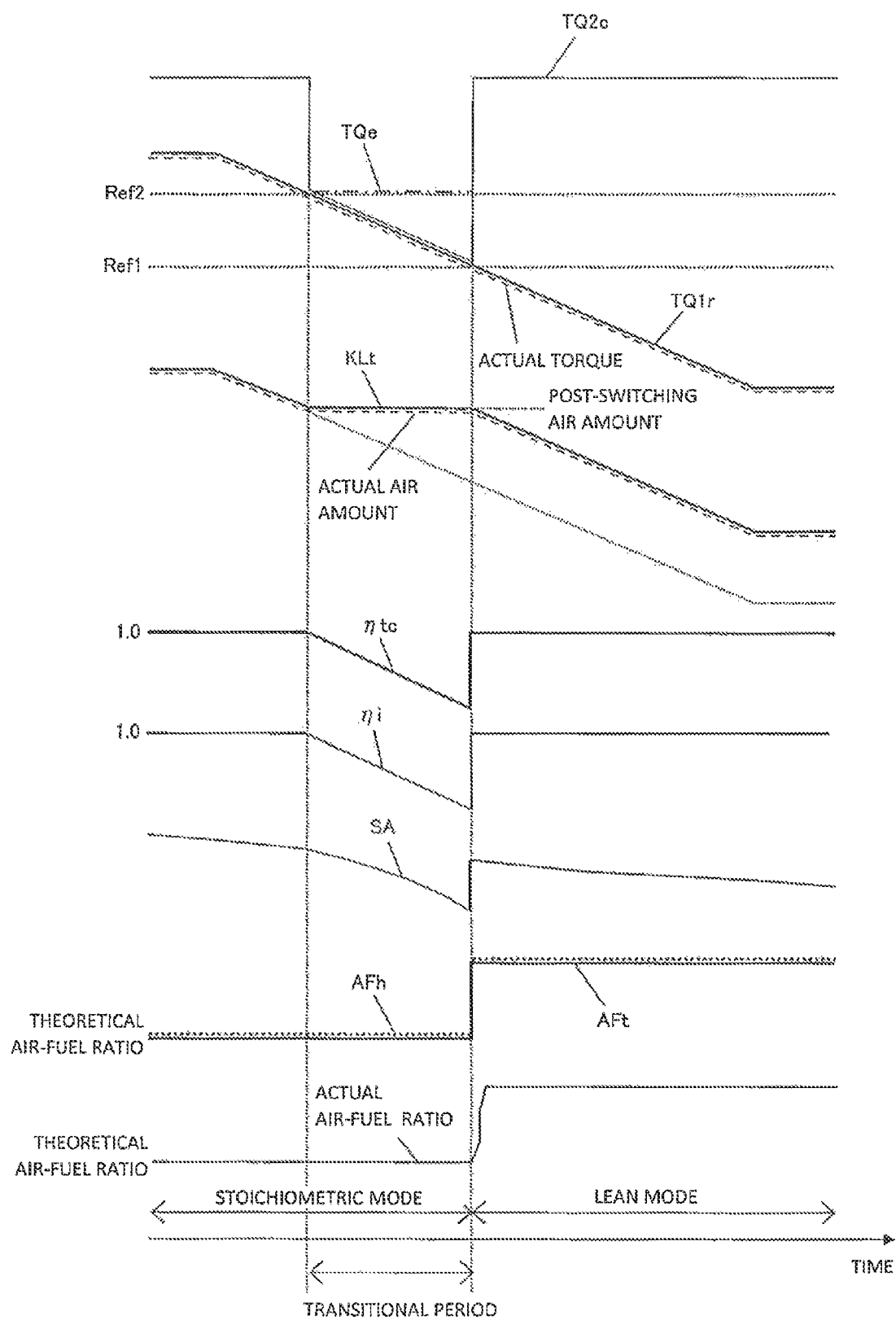
FIG. 8 is a time chart that illustrates an image of results of control in deceleration that is performed by the control device according to Embodiment 2 of the present invention.
Figure 9:
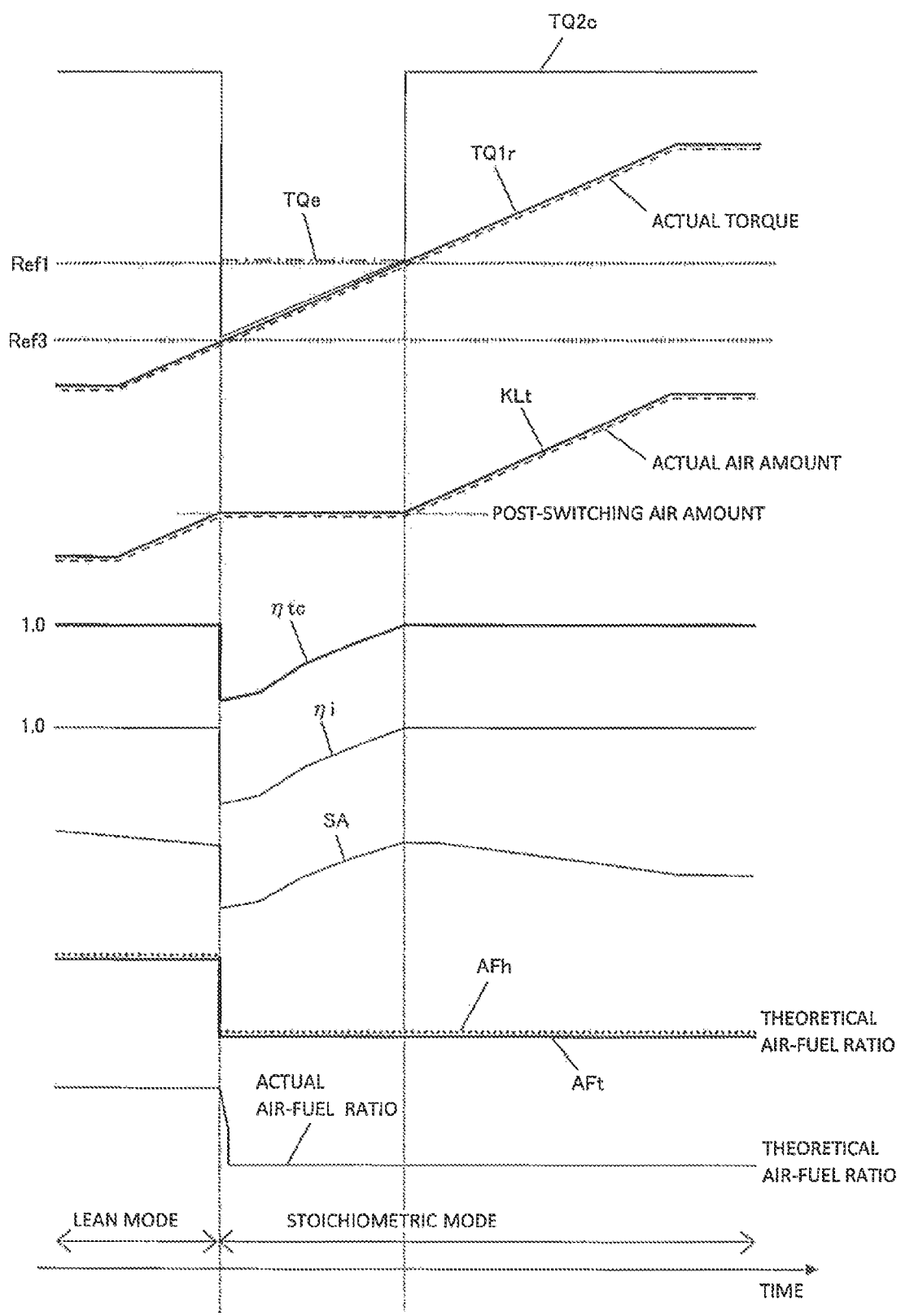
FIG. 9 is a time chart that illustrates an image of results of control in acceleration that is performed by the control device according to Embodiment 2 of the present invention.

FIG. 8 is a time chart that illustrates an image of results of control performed in deceleration by the ECU according to the present embodiment. FIG. 9 is a time chart that illustrates an image of results of control performed in acceleration by the ECU according to the present embodiment. Each of the time charts is constituted by charts at multiple levels, and the contents shown in the respective charts are common with the contents of the time chart illustrated in FIG. 5 and FIG. 6. Note that, in this case also the target efficiency for switching serves as the final target efficiency.

First, results of control in deceleration will be described based on FIG. 8. In deceleration, operations until the requested first torque decreases as far as the level of the second reference value that is represented by "Ref2" are the same as in the control results in Embodiment 1 that are illustrated in FIG. 5. When the requested first torque becomes lower than the second reference value, the target efficiency for switching starts to decrease from 1 that is a standard value. Further, during a period in which the requested first torque decreases as far as the level of the first reference value, the target efficiency for switching continues to be updated to a value that is calculated by the formula "ηtc=TQ1r÷Ref2". During this period, the virtual air-fuel ratio is maintained at the first air-fuel ratio together with the target air-fuel ratio. Consequently, the target air amount that is calculated based on the requested first torque and the virtual air-fuel ratio is maintained at a constant value that is calculated based on the torque of the second reference value and the first air-fuel ratio. In due course the requested first torque decreases to the level of the first reference value that is represented by "Ref1", and at that time point the virtual air-fuel ratio is switched from the first air-fuel ratio to the second air-fuel ratio together with the target air-fuel ratio.

Operation according to the second air-fuel ratio that is a lean air-fuel ratio requires a larger air amount than the air amount required for operation according to the first air-fuel ratio that is the theoretical air-fuel ratio. Therefore, in a case as proposed in the first solution in which the air-fuel ratio that is used for calculating the target air amount is only switched in a step manner from the first air-fuel ratio to the second air-fuel ratio, the target air amount will also increase in a step manner at the time point of such switching. In the present embodiment also, the virtual air-fuel ratio is switched in a step manner from the first air-fuel ratio to the second air-fuel ratio. However, according to the logic adopted in the present embodiment, when the target air amount decreases as far as the air amount after switching ("post-switching air amount" that is shown in the drawing) of the target air-fuel ratio, the target air amount is maintained at the post-switching air amount until switching of the target air-fuel ratio and the virtual air-fuel ratio is performed. By this means, it is effectively prevented that the target air amount increases in a step manner at the time point at which the target air-fuel ratio is switched and fluctuations occur in the actual air-fuel ratio in accompaniment therewith.

During a period from when the requested first torque becomes lower than the second reference value until the requested first torque becomes lower than the first reference value, the target second torque for switching is set as a valid value in response to the target efficiency for switching being lower than 1. That is, the target second torque for switching is set to the same value as the requested first torque. On the other hand, the estimated torque that is calculated based on the current throttle opening degree and the current valve timing becomes a larger value than the requested first torque as a result of the target air amount being maintained at the post-switching air amount by the action of the target efficiency for switching. Consequently, the instruction ignition timing efficiency that is the proportion of the target second torque for switching relative to the estimated torque becomes a value that is less than 1. In response to the instruction ignition timing efficiency becoming a value less than 1, the ignition timing is retarded relative to the optimal ignition timing. As a result, an increase in torque that is caused by an excess in the air amount is cancelled out by a decrease in torque that is caused by retardation of the ignition timing, and thus a divergence in the actual torque from the requested first torque is prevented.

As described above, according to the logic adopted in the present embodiment, the air-fuel ratio can be switched with favorable responsiveness from the first air-fuel ratio that is the theoretical air-fuel ratio to the second air-fuel ratio that is a leaner air-fuel ratio than the theoretical air-fuel ratio while achieving a smooth decrease in torque that is consistent with a deceleration request of the driver. In addition, in comparison to Embodiment 1, there is also the advantage that fluctuations in the air amount that accompany the process of switching the operation mode can be suppressed.

Next, results of control in acceleration will be described based on FIG. 9. In acceleration, operations until the requested first torque increases as far as the level of the third reference value that is represented by "Ref3" are the same as in the control results in Embodiment 1 that are illustrated in FIG. 6. When the requested first torque becomes greater than the third reference value, the target air-fuel ratio and the virtual air-fuel ratio are both switched simultaneously from the second air-fuel ratio to the first air-fuel ratio that is the theoretical air-fuel ratio. In response thereto, the target efficiency for switching decreases in a step manner from 1 that is the standard value. Further, during a period in which the requested first torque increases to the level of the first reference value, the target efficiency for switching continues to be updated to a value that is calculated by the formula "$\eta tc=TQ1r \div Ref1$". Consequently, the target air amount that is calculated based on the requested first torque and the virtual air-fuel ratio is maintained at a constant value that is calculated based on the torque of the first reference value and the first air-fuel ratio. In due course the requested first torque reaches the level of the first reference value, and at that time point the value of the target efficiency for switching returns to 1 that is the standard value.

Operation according to the first air-fuel ratio that is the theoretical air-fuel ratio requires a smaller air amount than the air amount required for operation according to the second air-fuel ratio that is a lean air-fuel ratio. Therefore, in a case as proposed in the first solution in which the air-fuel ratio that is used for calculating the target air amount is only switched in a step manner from the second air-fuel ratio to the first air-fuel ratio, the target air amount will also decrease in a step manner at the time point of such switching. In the present embodiment also, the virtual air-fuel ratio is switched in a step manner from the second air-fuel ratio to the first air-fuel ratio. However, according to the logic adopted in the present embodiment, when the target air amount increases as far as the air amount after switching ("post-switching air amount" that is shown in the drawing) of the target air-fuel ratio, the target air amount is maintained as it is at the post-switching air amount. By this means, it is effectively prevented that the target air amount decreases in a step manner at the time point at which the target air-fuel ratio is switched and fluctuations occur in the actual air-fuel ratio in accompaniment therewith.

During a period from when the requested first torque becomes greater than the third reference value until the requested first torque becomes greater than the first reference value, the target second torque for switching is set to the same value as the requested first torque in response to the target efficiency for switching being lower than 1. On the other hand, the estimated torque becomes a larger value than the requested first torque as a result of the target air amount being maintained at the post-switching air amount by the action of the target efficiency for switching. Consequently, the instruction ignition timing efficiency that is the proportion of the target second torque for switching relative to the estimated torque becomes a value that is less than 1. In response to the instruction ignition timing efficiency becoming a value less than 1, the ignition timing is retarded relative to the optimal ignition timing. As a result, an increase in torque that is caused by an excess in the air amount is cancelled out by a decrease in torque that is caused by retardation of the ignition timing, and a divergence in the actual torque from the requested first torque is prevented.

As described above, according to the logic adopted in the present embodiment, the air-fuel ratio can be switched with favorable responsiveness from the second air-fuel ratio that is a leaner air-fuel ratio than the theoretical air-fuel ratio to the first air-fuel ratio that is the theoretical air-fuel ratio while achieving a smooth increase in torque that is consistent with an acceleration request of the driver. In addition, in comparison to Embodiment 1, there is also the advantage that fluctuations in the air amount that accompany the process of switching the operation mode can be suppressed.

Embodiment 3

Next, Embodiment 3 of the present invention will be described referring to the drawing.

Embodiment 3 differs from Embodiments 1 and 2 in the logic of the arithmetic unit 122. The overall logic of the ECU is common to that of Embodiment 1, and the logic of the ECU according to the present embodiment can also be represented by FIG. 1.

Figure 10:
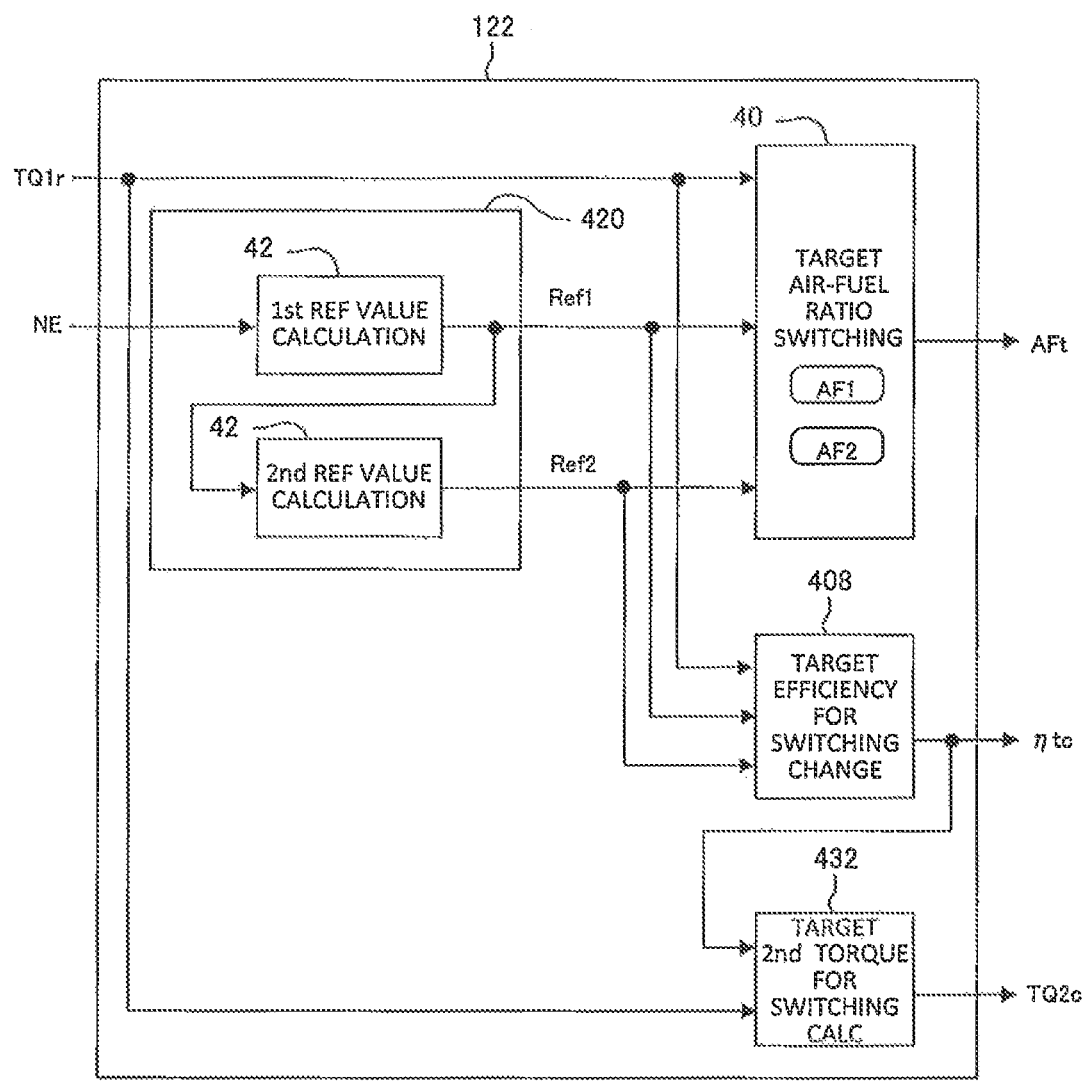
FIG. 10 is a block diagram illustrating logic for switching an operation mode of a control device according to Embodiment 3 of the present invention.

FIG. 10 is a block diagram illustrating the logic of the arithmetic unit 122 according to the present embodiment. The arithmetic unit 122 according to the present embodiment includes arithmetic units 402, 420, 408 and 432. Among these arithmetic units, the arithmetic units 402, 420 and 432 are common with the arithmetic units according to Embodiment 2. However, although the arithmetic unit 420 according to Embodiments 1 and 2 calculates three reference values, the arithmetic unit 420 according to the present embodiment is configured to drive only the arithmetic unit 422 that calculates the first reference value and the arithmetic unit 424 that calculates the second reference value. Hereunder, the arithmetic unit 408 that constitutes a difference relative to Embodiment 2 will be described.

The arithmetic unit 408 is provided in place of the arithmetic unit 406 according to Embodiment 2. The requested first torque is input to the arithmetic unit 408. In addition, the first reference value and the second reference value that are calculated by the arithmetic unit 420 are set with respect to the arithmetic unit 408.

The arithmetic unit 408 changes the value of the target efficiency for switching based on the relation between the requested first torque that is input and the reference values. The arithmetic unit 408 corresponds to parameter value changing means in the present invention. In a situation in which the requested first torque is decreasing in accordance with a deceleration request of the driver, the arithmetic unit 408 executes a change in the target efficiency for switching by a procedure that is common with the procedure in Embodiment 2. On the other hand, in a situation in which the requested first torque is increasing in accordance with an acceleration request of the driver, the arithmetic unit 408 executes a change in the target efficiency for switching by the following procedure.

During a period in which the requested first torque is less than the first reference value, the arithmetic unit 408 sets the target efficiency for switching to 1 in response to the requested first torque being less than the first reference value. When the requested first torque becomes greater than the first reference value in due course, the arithmetic unit 408 decreases the target efficiency for switching from 1 in a step manner in response to the requested first torque increasing to a value that is equal to or greater than the first reference value. Further, during a period in which the requested first torque increases from the first reference value to the second reference value, the arithmetic unit 408 calculates the proportion of the requested first torque relative to the second reference value as the target efficiency for switching. That is, a calculation represented by the formula "ηtc=TQ1r Ref2" is performed by the arithmetic unit 408. Because the torque obtained by dividing the requested first torque by the target efficiency is converted to a target air amount, when the target efficiency for switching is represented by the above formula, the torque of the second reference value is converted to the target air amount. When the requested first torque becomes greater than the second reference value, the arithmetic unit 408 again sets the target efficiency for switching to 1 in response to the requested first torque being greater than the second reference value.

Next, control results in a case in which engine control is executed in accordance with the logic for switching the operation mode that is adopted in the present embodiment will be described based on a time chart illustrating an image thereof. However, since results of control in deceleration are similar to results obtained in Embodiment 2, a description thereof is omitted here.

Figure 11:
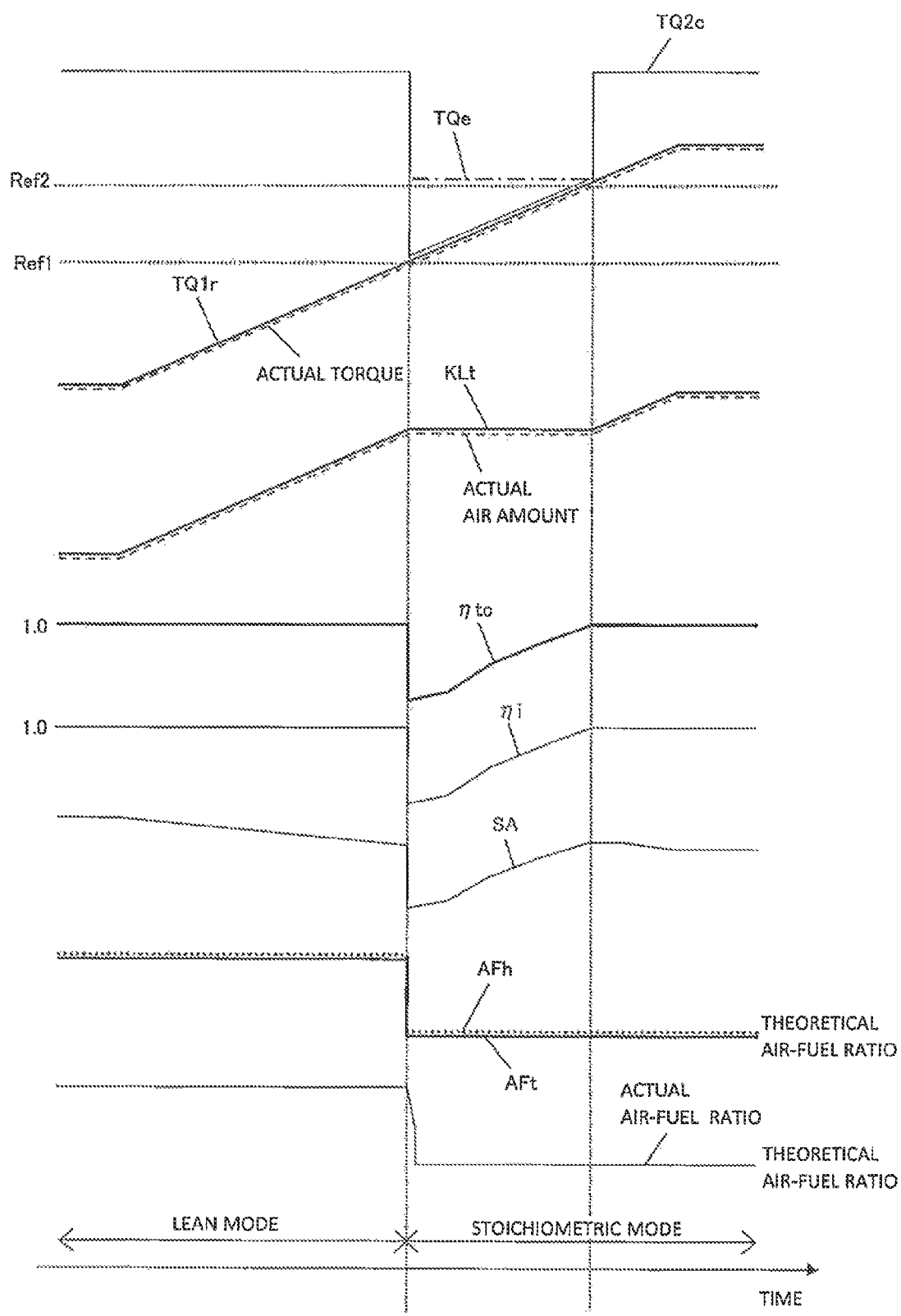
FIG. 11 is a time chart that illustrates an image of results of control in acceleration that is performed by the control device according to Embodiment 3 of the present invention.

FIG. 11 is a time chart that illustrates an image of results of control in acceleration that is performed by the ECU according to the present embodiment. The contents shown in the charts at the respective levels in FIG. 11 are common with the contents of the time chart illustrated in FIG. 9. Note that, in this case also the target efficiency for switching is taken as being the final target efficiency.

In acceleration, operations until the requested first torque increases as far as the level of the first reference value that is represented by "Ref1" are the same as the operations until the requested first torque increases as far as the level of the third reference value in Embodiment 2. When the requested first torque becomes greater than the first reference value, the target air-fuel ratio and the virtual air-fuel ratio are both switched simultaneously from the second air-fuel ratio to the first air-fuel ratio that is the theoretical air-fuel ratio. In response thereto, the target efficiency for switching decreases in a step manner from 1 that is the standard value. Further, during a period in which the requested first torque increases to the level of the first reference value, the target efficiency for switching continues to be updated to a value that is calculated by the formula "ηtc=TQ1r÷Ref2". Consequently, since the target air amount that is calculated based on the requested first torque and the virtual air-fuel ratio is maintained at a constant value that is calculated based on the torque of the second reference value and the first air-fuel ratio, it is effectively prevented that the target air amount decreases in a step manner at the time point at which the target air-fuel ratio is switched and fluctuations occur in the actual air-fuel ratio in accompaniment therewith. In due course the requested first torque reaches the level of the second reference value, and at that time point the value of the target efficiency for switching returns to 1 that is the standard value.

During a period from when the requested first torque becomes greater than the first reference value until the requested first torque becomes greater than the second reference value, the target second torque for switching is set to the same value as the requested first torque in response to the target efficiency for switching being lower than 1. On the other hand, the estimated torque becomes a larger value than the requested first torque as a result of the target air amount being maintained at the post-switching air amount by the action of the target efficiency for switching. Consequently, the instruction ignition timing efficiency that is the proportion of the target second torque for switching relative to the estimated torque becomes a value that is less than 1. In response to the instruction ignition timing efficiency becoming a value that is less than 1, the ignition timing is retarded relative to the optimal ignition timing. As a result, an increase in torque that is caused by an excess in the air amount is cancelled out by a decrease in torque that is caused by retardation of the ignition timing, and thus a divergence in the actual torque from the requested first torque is prevented.

As described above, according to the logic adopted in the present embodiment, the air-fuel ratio can be switched with favorable responsiveness from the second air-fuel ratio that is a leaner air-fuel ratio than the theoretical air-fuel ratio to the first air-fuel ratio that is the theoretical air-fuel ratio while achieving a smooth increase in torque that is consistent with an acceleration request of the driver. In addition, in comparison to Embodiment 1, there is also the similar advantage to Embodiment 2 that fluctuations in the air amount that accompany the process of switching the operation mode can be suppressed.

Note that, although in Embodiments 1 and 2 the air-fuel ratio is switched from the second air-fuel ratio to the first air-fuel ratio before the requested first torque reaches the first reference value, according to the present embodiment the air-fuel ratio can be switched from the second air-fuel ratio to the first air-fuel ratio at the time point at which the requested first torque reaches the first reference value. That is, a standard torque for switching from the first air-fuel ratio to the second air-fuel ratio in deceleration and a standard torque for switching from the second air-fuel ratio to the first air-fuel ratio in acceleration can be made to match.

Embodiment 4

Next, Embodiment 4 of the present invention will be described with reference to the drawing.

An engine which is a control object in the present embodiment is a spark-ignition type, four-cycle reciprocating engine, and is a supercharged lean-burn engine that is equipped with a turbocharger. Actuators that are actuated by an ECU that controls the operations of the engine according to the present embodiment include, in addition to a throttle, a VVT, an ignition device and an injector, a waste gate valve (hereunder, referred to as "WGV") that is provided in a turbocharger. The WGV is a supercharging characteristic varying actuator that varies a supercharging characteristic of the turbocharger. Because a supercharging characteristic of the turbocharger causes an air amount to change, the WGV is categorized as the first actuator that causes an air amount to change, similarly to the throttle and VVT.

Figure 12:
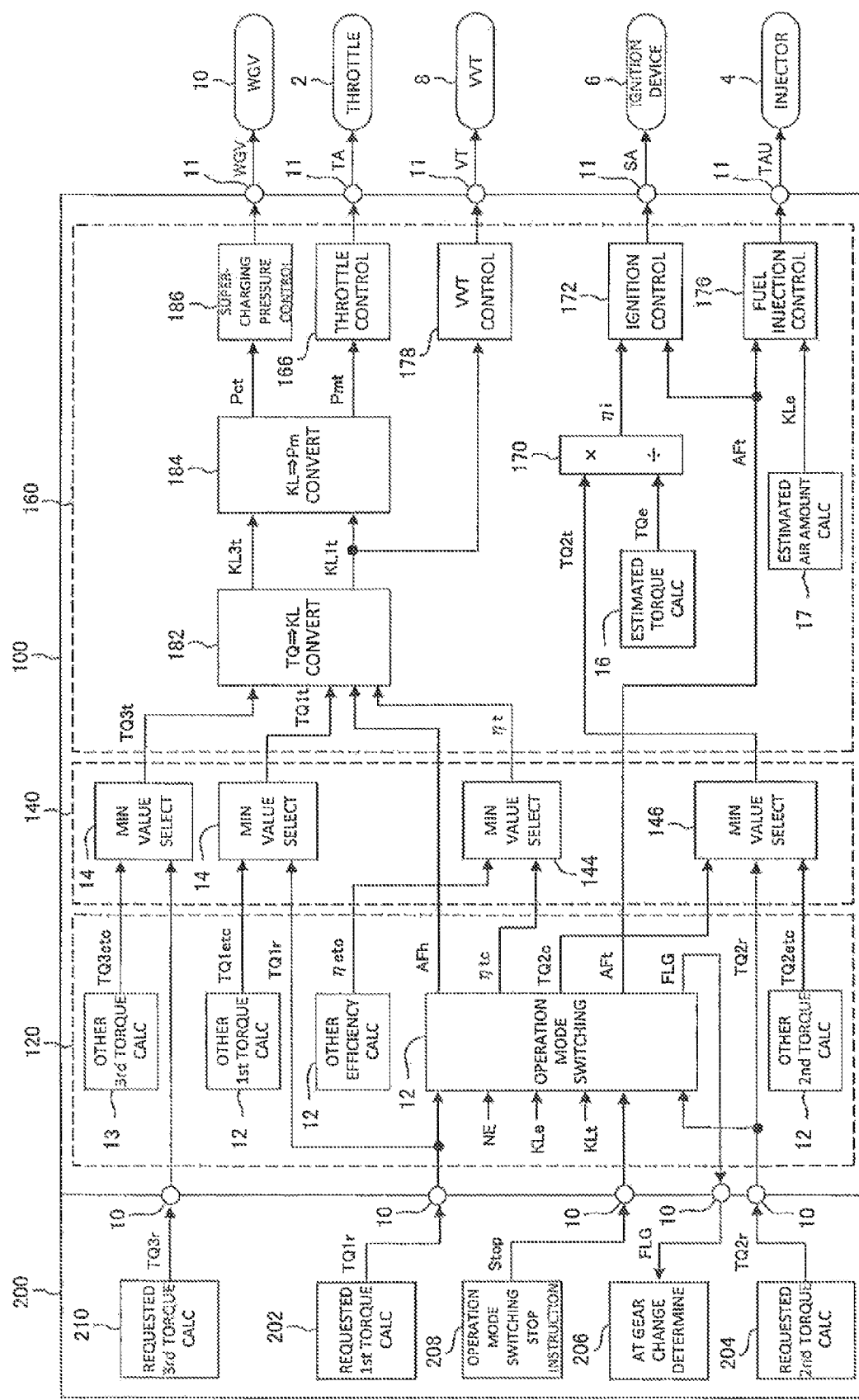
FIG. 12 is a block diagram illustrating the logic of a control device according to Embodiment 4 of the present invention.

In FIG. 12, the logic of the ECU according to the present embodiment is illustrated by means of a block diagram. The ECU includes an engine controller 100 and a powertrain manager 200. In the block showing the powertrain manager 200, various functions that the powertrain manager 200 is equipped with are represented by blocks. Among these, blocks representing functions that are common to those of the ECU according to Embodiment 1 are denoted by common reference numerals. Further, in the block showing the engine controller 100, among various functions that the engine controller 100 is equipped with, functions relating to coordinated operations of the actuators are represented by blocks. Among these, blocks representing functions that are common to those of the ECU according to Embodiment 1 are denoted by common reference numerals. The following description centers on differences with respect to Embodiment 1, that is, on blocks that represent functions that are specific to control of a supercharged lean-burn engine.

The powertrain manager 200 according to the present embodiment is equipped with an arithmetic unit 210 in addition to the arithmetic units 202, 204, 206 and 208 that are common with Embodiment 1. The arithmetic unit 210 calculates a requested third torque and sends the calculated value to the engine controller 100. In the drawing, the requested third torque is described as "TQ3$r$". Similarly to the first torque, the third torque is a torque that the engine is required to generate steadily or over an extended period. The relation between the third torque and the first torque is similar to the relation between the first torque and the second torque. That is, when viewed from the side of the first torque, the first torque is a torque of a kind with respect to which the urgency or priority is higher than the third torque and for which a high responsiveness is required of the engine. That is, the first torque is of a kind which is required to be realized at an earlier timing than the third torque. The requested third torque is a requested value of the third torque that the powertrain manager 200 requests with respect to the engine. When the three kinds of requested torques that are calculated by the powertrain manager 200 are listed in the order of greater urgency or higher priority, that is, the order of higher responsiveness required of the engine, the order thereof is: requested second torque, requested first torque, requested third torque. The arithmetic unit 210 calculates the requested third torque based on a signal that corresponds to the state of the opening degree of the accelerator pedal. In the present embodiment, together with the requested first torque, the requested third torque corresponds to a requested torque in the present invention. A torque that is obtained by removing a pulse component which is temporarily decreasing torque from the requested first torque can also be adopted as the requested third torque.

The engine controller 100 according to the present embodiment is constituted by three large arithmetic units 120, 140 and 160, similarly to Embodiment 1. The large arithmetic unit 120 is equipped with an arithmetic unit 130 in addition to the arithmetic units 122, 124, 126 and 128 that are common with Embodiment 1. The arithmetic unit 130 calculates, as a control parameter for the engine, a torque that is classified as a third torque among torques that are necessary for maintaining the current operating state of the engine or for realizing a scheduled predetermined operating state. In this case, a torque that is calculated by the arithmetic unit 130 is referred to as "other third torque". In the drawing, the other third torque is described as "TQ3etc". The arithmetic unit 130 outputs a valid value only in a case where such a torque is actually required, and calculates an invalid value during a period in which such a torque is not required. The invalid value is set to a value that is greater than the maximum indicated torque that the engine can output.

The large arithmetic unit 140 according to the present embodiment is equipped with an arithmetic unit 148 in addition to the arithmetic units 142, 144 and 146 that are common with Embodiment 1. The arithmetic unit 148 is configured to perform a mediation process with respect to the third torque. The requested third torque and the other third torque are input to the arithmetic unit 148. The arithmetic unit 148 performs a mediation process on these values, and outputs a torque that is obtained as the mediation result as a target third torque that is finally determined. In the drawing, the target third torque that is finally determined is described as "TQ3$t$". Minimum value selection is used as the mediation method in the arithmetic unit 148. Accordingly, in a case where a valid value is not output from the arithmetic unit 130, the requested third torque that is provided from the powertrain manager 200 is calculated as the target third torque.

The large arithmetic unit 160 according to the present embodiment handles each of the target first torque, the target second torque and the target third torque that are input from the large arithmetic unit 140 as target values of the torque with respect to the engine. Therefore, the large arithmetic unit 160 according to the present embodiment is equipped with an arithmetic unit 182 instead of the arithmetic unit 162 according to Embodiment 1, and is equipped with an arithmetic unit 184 instead of the arithmetic unit 164 according to Embodiment 1.

The target first torque and the target third torque are input to the arithmetic unit 182. Furthermore, the target efficiency and the virtual air-fuel ratio are also input thereto. The arithmetic unit 182 corresponds to target air amount calculation means in the present invention. By means of a method common to that employed by the arithmetic unit 162 according to Embodiment 1, the arithmetic unit 182 uses the target efficiency and the virtual air-fuel ratio to back-calculate from the target first torque a target air amount (hereunder, referred to as "target first air amount") for achieving the target first torque. The target first air amount is described as "KL1$t$" in the drawing. In the present embodiment, the target first air amount is used by the arithmetic unit 178 to calculate the target valve timing.

Further, concurrently with calculation of the target first air amount, the arithmetic unit 182 uses the target efficiency and the virtual air-fuel ratio to back-calculate from the target third torque a target air amount (hereunder, referred to as "target third air amount") for achieving the target third torque. The target third air amount is described as "KL3$t$" in the drawing. When calculating the target third air amount also, the target efficiency and virtual air-fuel ratio are used as parameters that provide a conversion efficiency of the air amount to torque. If the value of the virtual air-fuel ratio is changed in the same manner as in Embodiment 1 in the calculation of the target first air amount, the value of the virtual air-fuel ratio is also similarly changed in the calculation of the target third air amount. Further, if the value of the target efficiency for switching is changed in the same manner as in Embodiment 2 or 3 in the calculation of the target first air amount, the value of the target efficiency for switching is also similarly changed in the calculation of the target third air amount.

The arithmetic unit 184 back-calculates the target intake pipe pressure from the target first air amount by a method common to that employed by the arithmetic unit 164 according to Embodiment 1. The target intake pipe pressure is described as "Pmt" in the drawing. The target intake pipe pressure is used by the arithmetic unit 166 to calculate the target throttle opening degree.

In addition, concurrently with calculation of the target intake pipe pressure, the arithmetic unit 184 back-calculates a target supercharging pressure from the target third air amount. The target supercharging pressure is described as "Pct" in the drawing. When calculating the target supercharging pressure, first, using a method common to that used to calculate the target intake pipe pressure, the target third air amount is converted to an intake pipe pressure. A reserve pressure is then added to the intake pipe pressure obtained by converting the target third air amount, and the sum value is calculated as the target supercharging pressure. The reserve pressure is the minimum margin of the supercharging pressure with respect to the intake pipe pressure. Note that, although the reserve pressure may be a fixed value, for example, the reserve pressure can also be changed in response to a change in the intake pipe pressure.

The large arithmetic unit 160 according to the present embodiment further includes an arithmetic unit 186. The arithmetic unit 186 calculates a target waste gate valve opening degree that is a target value of the waste gate valve opening degree, based on the target supercharging pressure. The target waste gate valve opening degree is described as "WGV" in the drawing. A map or model in which the supercharging pressure and the waste gate valve opening degree are associated is used to calculate the target waste gate valve opening degree. The target waste gate valve opening degree calculated by the arithmetic unit 186 is converted to a signal that drives the WGV 10, and is sent to the WGV 10 through an interface 115 of the ECU. The arithmetic unit 186 also corresponds to first actuator control means in the present invention. Note that, a duty ratio of a solenoid that drives the WGV 10 may also be adopted as the operation amount of the WGV 10 instead of the waste gate valve opening degree.

Figure 13:
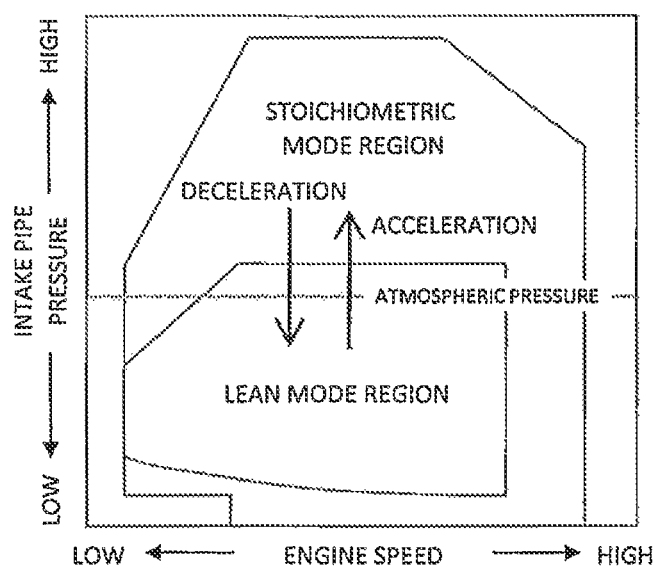
FIG. 13 is a view illustrating settings of operating ranges adopted by a control device according to Embodiment 4 of the present invention.

According to the ECU that is configured as described above, by subjecting the plurality of actuators 2, 4, 6, 8 and 10 including the WGV 10 to coordinated operations, the task of switching the air-fuel ratio with favorable responsiveness while smoothly changing the torque in response to a request of the driver can be achieved in a supercharged lean-burn engine also. FIG. 13 illustrates the settings of operating ranges according to the present embodiment. The operating ranges are defined by the intake pipe pressure and the engine speed. According to this drawing, a lean mode region in which the lean mode is selected is set in a low-to-medium speed and low-to-medium load region. Based on this drawing, it is found that the operation mode is switched from the stoichiometric mode to the lean mode in deceleration, and the operation mode is switched from the lean mode to the stoichiometric mode in acceleration. Further, based on this drawing, it is also found that there is a region in which the lean mode is also selected in a supercharging region in which the intake pipe pressure becomes higher than the atmospheric pressure. The settings of the operating ranges are mapped and stored in the ECU as illustrated in this drawing. The ECU executes switching of the operation mode in accordance with the map.

[Other]

The present invention is not limited to the above described embodiments, and various modifications can be made within a range that does not depart from the gist of the present invention. For example, the modifications described hereunder may be adopted.

The air-fuel ratio (virtual air-fuel ratio) that is used for calculating the target air amount in Embodiment 1 can be substituted with an equivalence ratio. The equivalence ratio is also a parameter that provides a conversion efficiency of the air amount to torque, and corresponds to a parameter that corresponds to the air-fuel ratio. Likewise, an excess air factor can be used as a parameter that provides a conversion efficiency of the air amount to torque.

A parameter corresponding to the ignition timing that provides a conversion efficiency of the air amount to torque is not limited to the target efficiency that is used in Embodiments 2 and 3, that is, a target value of the ignition timing efficiency. A configuration may also be adopted in which a torque-air amount conversion map that is used for calculating the target air amount is prepared for each ignition timing, and the value of the ignition timing that is used to search the map is changed in response to switching of the operation mode.

A variable lift amount device that makes a lift amount of the intake valve variable can also be used as a first actuator that changes the amount of air drawn into the cylinders. The variable lift amount device can be independently used instead of the throttle, or can be used in combination with another first actuator such as the throttle or VVT. The VVT may also be omitted.

A variable nozzle can also be used as a supercharging characteristic varying actuator that changes a supercharging characteristic of the turbocharger. Further, if the turbocharger is assisted by an electric motor, the electric motor can also be used as a supercharging characteristic varying actuator.

In the embodiment of the present invention, an injector as a second actuator is not limited to a port injector. An in-cylinder injector that injects fuel directly into a combustion chamber can also be used, and both a port injector and an in-cylinder injector may also be used in combination.

The first air-fuel ratio is not limited to the theoretical air-fuel ratio. The first air-fuel ratio can also be set to an air-fuel ratio that is leaner than the theoretical air-fuel ratio, and an air-fuel ratio that is leaner than the first air-fuel ratio can be set as the second air-fuel ratio.

REFERENCE SIGNS LIST

2 Throttle
4 Injector
6 Ignition device
8 Variable valve timing device
10 Waste gate valve
100 Engine controller
101 Interface as requested torque reception means
200 Powertrain manager
162, 182 Arithmetic unit as target air amount calculation means
164, 166, 178 Arithmetic unit as first actuator control means
174, 176 Arithmetic unit as second actuator control means
168, 170, 172 Arithmetic unit as third actuator control means
402 Arithmetic unit as target air-fuel ratio switching means
420 Arithmetic unit as reference value calculation means
404, 406, 408 Arithmetic unit as parameter value changing means

The invention claimed is:

1. A control device for an internal combustion engine that includes a first actuator that changes an amount of air that is drawn into a cylinder, a second actuator that supplies fuel into a cylinder, and a third actuator that ignites an air-fuel mixture in a cylinder, and that is configured to be capable of selecting between operation according to a first air-fuel ratio and operation according to a second air-fuel ratio that is leaner than the first air-fuel ratio, the control device comprising:

requested torque reception means for receiving a requested torque;

reference value calculation means for calculating a first reference value with respect to a torque based on an engine speed of the internal combustion engine, and calculating a second reference value with respect to the torque based on the first air-fuel ratio and an air amount with which the first reference value can be achieved under the second air-fuel ratio;

target air-fuel ratio switching means for setting a target air-fuel ratio to the first air-fuel ratio in response to the requested torque being greater than the first reference value, and switching the target air-fuel ratio from the first air-fuel ratio to the second air-fuel ratio in response to a decrease in the requested torque to an amount that is equal to or less than the first reference value;

target air amount calculation means for back-calculating from the requested torque a target air amount for achieving the requested torque by using a parameter that provides a conversion efficiency of an air amount to torque;

parameter value changing means for starting to change a value of the parameter in a direction that lowers the conversion efficiency in response to a decrease in the requested torque to a value that is equal to or less than the second reference value, and gradually changing the value of the parameter in a direction that lowers the conversion efficiency as the requested torque further decreases from the second reference value to the first reference value;

first actuator control means for determining an operation amount of the first actuator based on the target air amount, and operating the first actuator in accordance with the operation amount;

second actuator control means for determining a fuel supply amount based on the target air-fuel ratio, and operating the second actuator in accordance with the fuel supply amount; and third actuator control means for determining an ignition timing for achieving the requested torque based on the requested torque and a torque that is estimated based on the operation amount of the first actuator and the target air-fuel ratio, and operating the third actuator in accordance with the ignition timing.

2. The control device for an internal combustion engine according to claim 1, wherein:

the parameter is a parameter corresponding to an air-fuel ratio; and the parameter value changing means sets the value of the parameter to a value corresponding to the first air-fuel ratio in response to the requested torque being greater than the second reference value, starts to change the value of the parameter from the value corresponding to the first air-fuel ratio in response to a decrease in the requested torque to a value that is equal to or less than the second reference value, and gradually changes the value of the parameter from the value corresponding to the first air-fuel ratio to a value corresponding to the second air-fuel ratio as the requested torque decreases from the second reference value to the first reference value.

3. The control device for an internal combustion engine according to claim 1, wherein:

the parameter is a parameter corresponding to an ignition timing; and the parameter value changing means sets the value of the parameter to a value corresponding to an optimal ignition timing in response to the requested torque being greater than the second reference value, starts to change the value of the parameter from the value corresponding to the optimal ignition timing in response to a decrease in the requested torque to a value that is equal to or less than the second reference value, and in a period until the requested torque decreases from the second reference value to the first reference value, gradually changes the value of the parameter in accordance with a proportion of the requested torque relative to the second reference value.

4. The control device for an internal combustion engine according to claim 3, wherein:

the parameter is expressed as a coefficient by which the requested torque is divided; and the parameter value changing means sets the value of the parameter to 1 in response to the requested torque being greater than the second reference value, starts to decrease the value of the parameter from 1 in response to a decrease in the requested torque to a value that is equal to or less than the second reference value, and in a period until the requested torque decreases from the second reference value to the first reference value, calculates a proportion of the requested torque relative to the second reference value as the value of the parameter.

5. The control device for an internal combustion engine according to claim 1, wherein:

the reference value calculation means includes means for calculating a third reference value with respect to a torque based on the second air-fuel ratio and an air amount with which the first reference value can be achieved under the first air-fuel ratio;

the target air-fuel ratio switching means includes means for setting the target air-fuel ratio to the second air-fuel ratio in response to the requested torque being less than the third reference value, and switching the target air-fuel ratio from the second air-fuel ratio to the first air-fuel ratio in response to an increase in the requested torque to a value that is equal to or greater than the third reference value; and the parameter value changing means includes means for starting to change the value of the parameter in a direction that raises the conversion efficiency in response to an increase in the requested torque to a value that is equal to or greater than the third reference value, and gradually changing the value of the parameter in a direction that raises the conversion efficiency as the requested torque further increases from the third reference value towards the first reference value.

6. The control device for an internal combustion engine according to claim 5, wherein:

the parameter is a parameter corresponding to an air-fuel ratio; and the parameter value changing means sets the value of the parameter to a value corresponding to the second air-fuel ratio in response to the requested torque being less than the third reference value, starts to change the value of the parameter from the value corresponding to the second air-fuel ratio in response to an increase in the requested torque to a value that is equal to or greater than the third reference value, and gradually changes the value of the parameter from the value corresponding to the second air-fuel ratio towards a value corresponding to the first air-fuel ratio as the requested torque increases further from the third reference value towards the first reference value.

7. The control device for an internal combustion engine according to claim 5, wherein:
the parameter is a parameter corresponding to an ignition timing; and
the parameter value changing means sets the value of the parameter to a value corresponding to an optimal ignition timing in response to the requested torque being less than the third reference value, decreases the value of the parameter in a step manner to a value corresponding to an ignition timing that is retarded relative to the optimal ignition timing in response to an increase in the requested torque to a value that is equal to or greater than the third reference value, and in a period until the requested torque increases from the third reference value to the first reference value, gradually changes the value of the parameter in accordance with a proportion of the requested torque relative to the first reference value.

8. The control device for an internal combustion engine according to claim 7, wherein:
the parameter is expressed as a coefficient by which the requested torque is divided; and
the parameter value changing means sets the value of the parameter to 1 in response to the requested torque being less than the third reference value, decreases the value of the parameter from 1 in a step manner in response to an increase in the requested torque to a value that is equal to or greater than the third reference value, and in a period until the requested torque increases from the third reference value to the first reference value, calculates a proportion of the requested torque relative to the first reference value as the value of the parameter.

9. The control device for an internal combustion engine according to claim 1, wherein:
the target air-fuel ratio switching means includes means for setting the target air-fuel ratio to the second air-fuel ratio in response to the requested torque being less than the first reference value, and switching the target air-fuel ratio from the second air-fuel ratio to the first air-fuel ratio in response to an increase in the requested torque to a value that is equal to or greater than the first reference value; and
the parameter value changing means includes means for starting to change the value of the parameter in a direction that raises the conversion efficiency in response to an increase in the requested torque to a value that is equal to or greater than the first reference value, and gradually changing the value of the parameter in a direction that raises the conversion efficiency as the requested torque further increases from the first reference value towards the second reference value.

10. The control device for an internal combustion engine according to claim 9, wherein:
the parameter is a parameter corresponding to an ignition timing; and
the parameter value changing means sets the value of the parameter to a value corresponding to an optimal ignition timing in response to the requested torque being less than the first reference value, decreases the value of the parameter in a step manner to a value corresponding to an ignition timing that is retarded relative to the optimal ignition timing in response to an increase in the requested torque to a value that is equal to or greater than the first reference value, and in a period until the requested torque increases from the first reference value to the second reference value, gradually changes the value of the parameter in accordance with a proportion of the requested torque relative to the second reference value.

11. The control device for an internal combustion engine according to claim 10, wherein:
the parameter is expressed as a coefficient by which the requested torque is divided; and
the parameter value changing means sets the value of the parameter to 1 in response to the requested torque being less than the first reference value, decreases the value of the parameter from 1 in a step manner in response to an increase in the requested torque to a value that is equal to or greater than the first reference value, and in a period until the requested torque increases from the first reference value to the second reference value, calculates a proportion of the requested torque relative to the second reference value as the value of the parameter.

12. The control device for an internal combustion engine according to claim 1, wherein:
the first actuator includes a throttle; and
the first actuator control means determines a target throttle opening degree based on a target intake pipe pressure that is calculated based on the target air amount, and operates the throttle in accordance with the target throttle opening degree.

13. The control device for an internal combustion engine according to claim 1, wherein:
the first actuator includes a variable valve timing device that varies a valve timing of an intake valve; and
the first actuator control means determines a target valve timing based on the target air amount, and operates the variable valve timing device in accordance with the target valve timing.

14. The control device for an internal combustion engine according to claim 1, wherein:
the internal combustion engine is a supercharged engine equipped with a supercharger,
the first actuator includes a supercharging characteristic varying actuator that varies a supercharging characteristic of the supercharger; and
the first actuator control means determines an operation amount of the supercharging characteristic varying actuator based on a target supercharging pressure that is calculated based on the target air amount, and operates the supercharging characteristic varying actuator in accordance with the operation amount.

15. A control device for an internal combustion engine that includes a first actuator that changes an amount of air that is drawn into a cylinder, a second actuator that supplies fuel into a cylinder, and a third actuator that ignites an air-fuel mixture in a cylinder, and that is configured to be capable of selecting between operation according to a first air-fuel ratio and operation according to a second air-fuel ratio that is leaner than the first air-fuel ratio, the control device being configured to:
receive a requested torque;
calculate a first reference value with respect to a torque based on an engine speed of the internal combustion engine, and calculating a second reference value with respect to the torque based on the first air-fuel ratio and an air amount with which the first reference value can be achieved under the second air-fuel ratio;

set a target air-fuel ratio to the first air-fuel ratio in response to the requested torque being greater than the first reference value, and switch the target air-fuel ratio from the first air-fuel ratio to the second air-fuel ratio in response to a decrease in the requested torque to an amount that is equal to or less than the first reference value;

back-calculate from the requested torque a target air amount for achieving the requested torque by using a parameter that provides a conversion efficiency of an air amount to torque;

start to change a value of the parameter in a direction that lowers the conversion efficiency in response to a decrease in the requested torque to a value that is equal to or less than the second reference value, and gradually change the value of the parameter in a direction that lowers the conversion efficiency as the requested torque further decreases from the second reference value to the first reference value;

determine an operation amount of the first actuator based on the target air amount, and operate the first actuator in accordance with the operation amount;

determine a fuel supply amount based on the target air-fuel ratio, and operate the second actuator in accordance with the fuel supply amount; and determine an ignition timing for achieving the requested torque based on the requested torque and a torque that is estimated based on the operation amount of the first actuator and the target air-fuel ratio, and operate the third actuator in accordance with the ignition timing.

* * * * *